US012769618B2

(12) United States Patent
Venkatanarayanan et al.

(10) Patent No.: US 12,769,618 B2
(45) Date of Patent: Oct. 20, 2026

(54) TECHNIQUES FOR EFFICIENTLY DETERMINING WHEN TO TRANSITION BETWEEN DATA PROCESSING STATES OR PHASES

(71) Applicant: Dell Products L.P., Hopkinton, MA (US)

(72) Inventors: Prakash Venkatanarayanan, Framingham, MA (US); Girish Sheelvant, Hopkinton, MA (US); Nagapraveen Veeravenkata Seela, Cary, NC (US); Sathya Krishna Murphy, Morrisville, NC (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/926,056

(22) Filed: Oct. 24, 2024

(65) Prior Publication Data

US 2026/0119332 A1 Apr. 30, 2026

(51) Int. Cl.
*G06F 11/14* (2026.01)
*G06F 11/1446* (2026.01)

(52) U.S. Cl.
CPC ................................ *G06F 11/1458* (2013.01)

(58) Field of Classification Search
CPC . G06F 9/50; G06F 16/11; G06F 16/27; G06F 11/1458
USPC .......................................................... 707/613
See application file for complete search history.

(56) References Cited

U.S. PATENT DOCUMENTS 10,002,173 B1 * 6/2018 Ramachandran ..... G06F 16/273
11,327,676 B1 * 5/2022 Fernandez .......... G06F 12/0862
2014/0359058 A1 * 12/2014 Karnawat ............ G06F 3/0611 709/217
2016/0314046 A1 * 10/2016 Kumarasamy ...... G06F 11/1435
2018/0018237 A1 * 1/2018 Morita ................ G06F 11/2074
2020/0034077 A1 * 1/2020 Haravu .................... G06F 3/067
2020/0042537 A1 * 2/2020 Kaushik .............. G06F 11/2097
2022/0342578 A1 * 10/2022 Chen ..................... G06F 3/0653
(Continued)

FOREIGN PATENT DOCUMENTS

CN 1856778 A * 11/2006 ............. G06F 13/36
CN 100544243 C * 9/2009 ............. H04L 47/10
(Continued)

*Primary Examiner* — Hicham Skhoun
(74) *Attorney, Agent, or Firm* — BainwoodHuang

(57) ABSTRACT

Techniques can include: establishing an asynchronous replication configuration of a volume V1 of a first system and a volume V2 of a second system; determining data changes between a successive pair of snapshots of V1; transferring the data changes from the first system to the second system; determining an average data transfer rate and an average data change rate; determining, based at least in part, on the average data transfer rate and the average data change rate, a predicted time denoting an amount of time expected to complete a final processing phase that transitions the asynchronous replication configuration from a first state to a second state; determining whether the predicted time exceeds a threshold; and responsive to determining that the predicted time does not exceed the threshold, performing the final processing phase that transitions the asynchronous replication configuration from the first state to the second state.

18 Claims, 17 Drawing Sheets

(56) References Cited

U.S. PATENT DOCUMENTS

| | | | | |
|---|---|---|---|---|
| 2023/0266991 | A1* | 8/2023 | Patel | G06F 9/45558 718/1 |
| 2024/0338385 | A1* | 10/2024 | Mallipeddi | G06F 3/067 |
| 2025/0013482 | A1* | 1/2025 | Sharma | G06F 9/45558 |

FOREIGN PATENT DOCUMENTS

| | | | | |
|---|---|---|---|---|
| CN | 116627714 | A * | 8/2023 | G06F 11/1451 |
| CN | 118382855 | A * | 7/2024 | G06F 3/0688 |
| CN | 119557929 | A * | 3/2025 | G06F 21/62 |
| WO | WO-2010044615 | A2 * | 4/2010 | H04L 47/70 |
| WO | WO-2022098450 | A1 * | 5/2022 | G06F 16/273 |

* cited by examiner

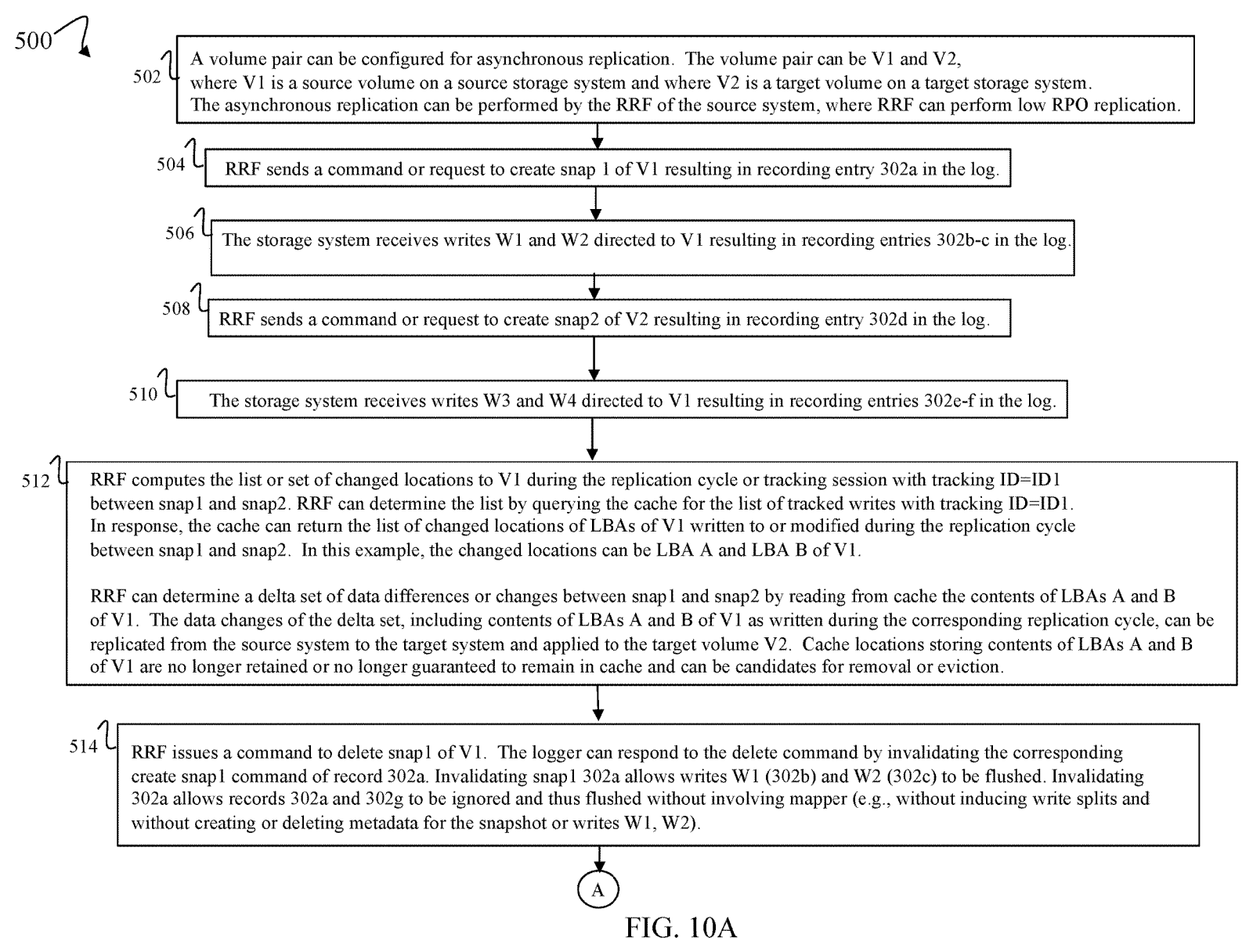

500

502 A volume pair can be configured for asynchronous replication. The volume pair can be V1 and V2, where V1 is a source volume on a source storage system and where V2 is a target volume on a target storage system. The asynchronous replication can be performed by the RRF of the source system, where RRF can perform low RPO replication.

504 RRF sends a command or request to create snap 1 of V1 resulting in recording entry 302a in the log.

506 The storage system receives writes W1 and W2 directed to V1 resulting in recording entries 302b-c in the log.

508 RRF sends a command or request to create snap2 of V2 resulting in recording entry 302d in the log.

510 The storage system receives writes W3 and W4 directed to V1 resulting in recording entries 302e-f in the log.

512 RRF computes the list or set of changed locations to V1 during the replication cycle or tracking session with tracking ID=ID1 between snap1 and snap2. RRF can determine the list by querying the cache for the list of tracked writes with tracking ID=ID1. In response, the cache can return the list of changed locations of LBAs of V1 written to or modified during the replication cycle between snap1 and snap2. In this example, the changed locations can be LBA A and LBA B of V1.

RRF can determine a delta set of data differences or changes between snap1 and snap2 by reading from cache the contents of LBAs A and B of V1. The data changes of the delta set, including contents of LBAs A and B of V1 as written during the corresponding replication cycle, can be replicated from the source system to the target system and applied to the target volume V2. Cache locations storing contents of LBAs A and B of V1 are no longer retained or no longer guaranteed to remain in cache and can be candidates for removal or eviction.

514 RRF issues a command to delete snap1 of V1. The logger can respond to the delete command by invalidating the corresponding create snap1 command of record 302a. Invalidating snap1 302a allows writes W1 (302b) and W2 (302c) to be flushed. Invalidating 302a allows records 302a and 302g to be ignored and thus flushed without involving mapper (e.g., without inducing write splits and without creating or deleting metadata for the snapshot or writes W1, W2).

A

FIG. 10A

TECHNIQUES FOR EFFICIENTLY DETERMINING WHEN TO TRANSITION BETWEEN DATA PROCESSING STATES OR PHASES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise:

establishing an asynchronous replication configuration of a first volume V1 of a first system and a second volume V2 of a second system, wherein data changes of V1 are asynchronously replicated from the first system to the second system for application to V2; determining a first set of data changes between a first pair of successive snapshots of V1; transferring the first set of data changes from the first system to the second system; determining an average data transfer rate and an average data change rate based, at least in part, on the first set of data changes and an amount of time taken to transfer the first set of data changes from the first system to the second system; determining, based at least in part, on the average data transfer rate and the average data change rate, a first predicted time denoting an amount of time expected to complete a final processing phase that transitions the asynchronous replication configuration from a first state to a second state; determining whether the first predicted time exceeds a first threshold; and responsive to determining that the first predicted time does not exceed the first threshold, performing the final processing phase that transitions the asynchronous replication configuration from the first state to the second state.

In at least one embodiment, processing can include: receiving, at the first system while transferring the first set of data changes, first writes to V1; responsive to determining that the first predicted time does exceed the first threshold, remaining in the first state and performing first processing including: determining, based on the first writes, a second set of data changes between a second pair of successive snapshots of V1, wherein the first writes are included in the second set of data changes; transferring the second set of data changes from the first system to the second system; determining a first updated value for the average data transfer rate and a second updated value for the average data change rate based, at least in part, on the second set of data changes and an amount of time taken to transfer the second set of data changes from the first system to the second system; determining, based at least in part, on the first updated value for average data transfer rate and the second updated value of the average data change rate, a second predicted time denoting an amount of time expected to complete the final processing phase that transitions the asynchronous replication configuration from the first state to the second state; determining whether the second predicted time exceeds the first threshold; and responsive to determining that the second predicted time does not exceed the first threshold, performing the final processing phase that transitions the asynchronous replication configuration from the first state to the second state.

In at least one embodiment, the average data change rate can denote an average rate at which content is written to V1 in connection with writes that are directed to V1 and are received at the first system. The average data transfer rate can denotes an average rate at which writes to V1 are transferred or replicated asynchronously over a replication link from the first system to the second system in accordance with the asynchronous replication configuration.

In at least one embodiment, the method can be performed in connection with migrating content of V1 of the first system to V2 of the second system, wherein in the first state, there can be one or more first paths that are between one or more hosts and the first system, and wherein V1 can be accessible over the one or more paths to one or more hosts for issuing I/Os directed to V1, wherein in the first state, there may be no paths between the one or more hosts and the second system over which the one or more hosts issue I/Os directed to V2. The final processing phase can include transitioning the asynchronous replication configuration from the first state to the second state where i) V1 is inaccessible or unavailable to the one or more hosts, and ii) V2 is accessible to the one or more hosts, over one or more second paths between the one or more hosts and the second system, so that the one or more hosts issue I/Os directed to V2 at the second system. Transitioning of the final processing phase can include: quiescing second writes that are directed to V1 and received at V1 from the one or more hosts whereby servicing of the second writes is not allowed to commence; draining third writes that are i) pending or in-progress, and ii) directed to V1 whereby the third writes are allowed to complete; subsequent to said quiescing and said draining, determining a final set of data changes to V1, wherein the final set includes the third writes, wherein the final set of data changes are data changes between a second pair of successive snapshots of V1; transferring the final set of data changes from the first system to the second system; and applying the final set of data changes to V2 of the second system.

The final processing phase can include, after transitioning from the first state to the second state, mirroring writes made to V2 of the second system onto V1 of the first system until migration of V1 to V2 is committed.

In at least one embodiment, the final processing phase can include performing a deterministic sequence of processing steps to determine whether to transition the asynchronous replication configuration from the first state to the second state within an amount of elapsed time that does not exceed the first threshold. Processing can include: measuring a first elapsed time denoting an amount of elapsed time of the final processing phase; responsive to the first elapsed time exceeding the first threshold, interrupting the final processing phase and resuming a first phase of processing performed when the asynchronous replication configuration is in the first state. The first phase can include: said determining the first set of data changes, said transferring the first set of data changes, and said determining the average data transfer rate and the average data change rate based, at least in part, on the first set of data changes and the amount of time taken to transfer the first set of data changes.

In at least one embodiment, resuming the first phase can include: determining a second set of data changes between a second pair of successive snapshots of V1; transferring the second set of data changes from the first system to the second system; determining a first updated value for the average data transfer rate and a second updated value for the average data change rate based, at least in part, on the second set of data changes and an amount of time taken to transfer the second set of data changes from the first system to the second system; determining, based at least in part, on the first updated value for average data transfer rate and the second updated value of the average data change rate, a second predicted time denoting an amount of time expected to complete the final processing phase that transitions the asynchronous replication configuration from the first state to the second state; determining whether the second predicted time exceeds the first threshold; and responsive to determining that the second predicted time does not exceed the first threshold, performing the final processing phase that transitions the asynchronous replication configuration from the first state to the second state.

In at least one embodiment, the method can be performed in connection with transitioning the asynchronous replication configuration from the first state to the second state, wherein in the second state, V1 and V2 can be configured in a synchronous replication configuration to synchronously replicate writes of V1 from the first system to V2 of the second system. In the first state, there may be one or more first paths that are between one or more hosts and the first system, and wherein V1 can be accessible over the one or more paths to one or more hosts for issuing I/Os directed to V1, wherein in the first state, there may be no paths between the one or more hosts and the second system over which the one or more hosts issue I/Os directed to V2. In the second state, V1 may be accessible over the one or more paths to the one or more hosts for issuing I/Os directed to V1, wherein in the second state, there may be no paths between the one or more hosts and the second system over which the one or more hosts issue I/Os directed to V2.

In at least one embodiment, the method can be performed in connection with transitioning the asynchronous replication configuration from the first state to the second state, wherein in the first state, writes of V1 can be asynchronously replicated from the first system to the second system in a first replication mode, and wherein in the second state, V1 and V2 can be configured in a second asynchronous replication mode to synchronously replicate writes of V1 from the first system to the second system. The second replication mode can perform one or more optimizations for improved asynchronous replication which are not performed in the first replication mode of the first state. The one or more optimizations can include one or more of: write tracking where data changes or writes to V1 to be replicated are stored in cache; holding transient or replication related snapshots used in determining sets of data changes to V1 in a log without flushing until said transient or replication related snapshots are deleted from the log; and content of V1 to be replicated remains in a cache of the first system until replicated from the first system to the second system.

In at least one embodiment, the method can be performed in connection with transitioning the asynchronous replication configuration from the first to the second state, wherein the second state can be a metro or stretched volume configuration where writes of V1 are synchronously replicated from the first system to the second system and where writes of V2 are synchronously replicated from the second system to the first system, wherein in the second state, one or more hosts can issue I/Os to V1 over first one or more paths to the first system, wherein in the second state, the one or more hosts issue can I/Os to V2 over second one or more paths to the second system, and wherein V1 and V2 can be configured to have a same identity when presented to the one or more hosts over the first one or more paths and the second one or more paths.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 7A, 7B, 10A and 10B are flowcharts of processing steps that can be performed in at least one embodiment in accordance with the techniques of the present disclosure.

DETAILED DESCRIPTION OF EMBODIMENT(S)

Figure 1:
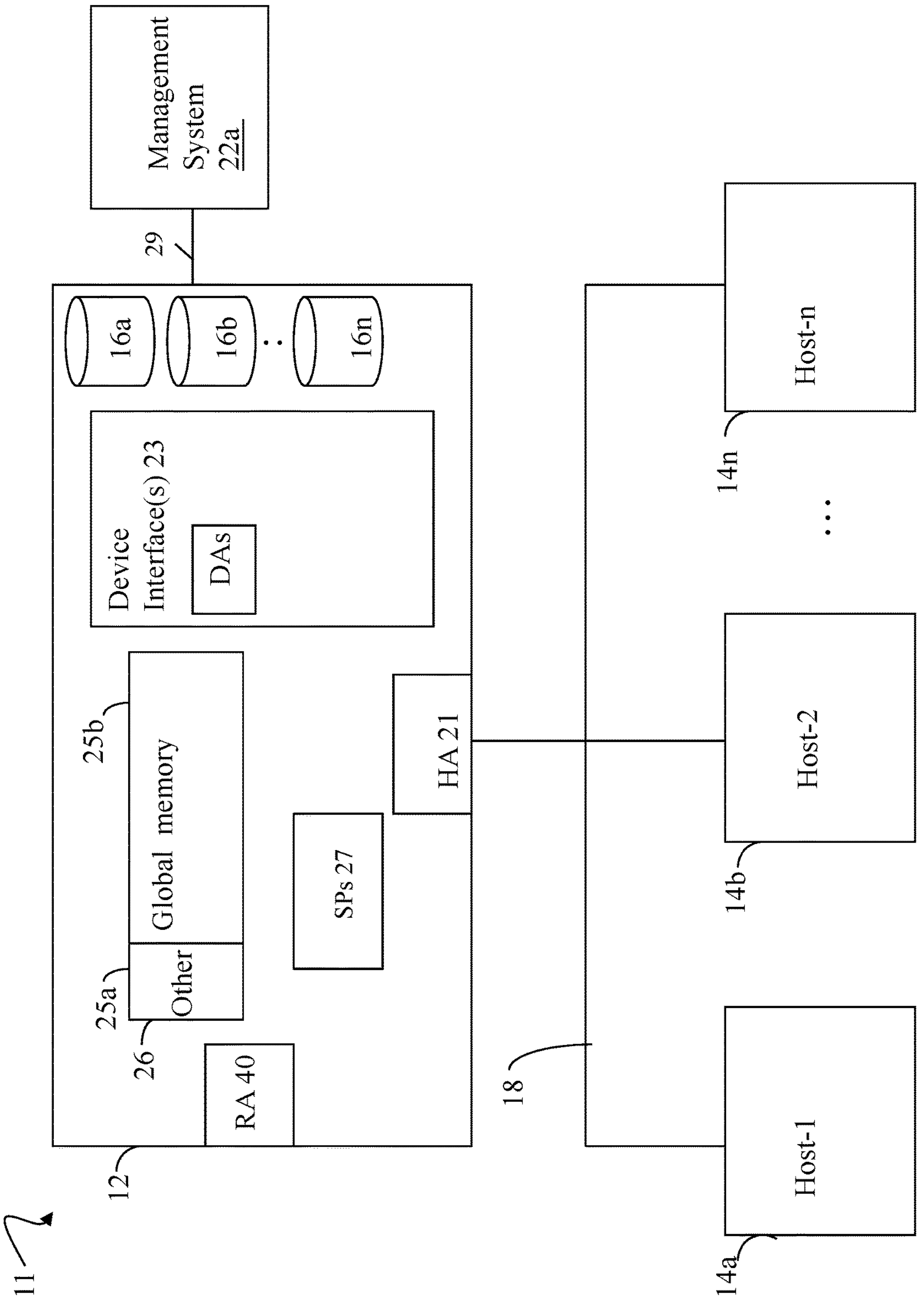
FIG. 1 is an example of components that can be included in a system in accordance with the techniques of the present disclosure.

There are various data processing applications or use cases that commonly perform a first phase that includes performing some level or degree of data synchronization between two volumes on two respective storage systems or sites. Subsequently after the first phase, processing can transition or switch to a final phase of the data processing for the particular application or use case. In at least one embodiment, the first phase can include performing asynchronous replication using a snapshot difference technique (discussed in more detail below). In at least one embodiment, the first phase can include performing asynchronous replication to perform i) an initial synchronization of the two volumes at an initial point in time whereby the initial synchronization can be a full volume copy based on volume content at the initial point in time, and ii) one or more subsequent synchronizations of the two volumes based on additional content written or changed content since the initial synchronization. There can be a need and/or desire to use time-based criteria based, at least in part, on information obtained during the first phase to determine when to transition to and perform the final phase.

Accordingly, the techniques of the present disclosure can be utilized in connection with determining when to transition between the first phase and the final phase for one or more data processing applications or use cases. In at least one embodiment, the techniques of the present disclosure can use time-based criteria based, at least in part, on information obtained during the first phase to determine when to transition between the first phase and the final phase.

In at least one embodiment, the first phase can include performing asynchronous replication, such as using the snapshot difference technique. In at least one embodiment, one use case scenario or data processing application is data migration where data is migrated from a first volume V1 of a first data storage system DS1 to a second volume V2 of a second data storage system DS2. In at least one embodiment, storage clients such as external hosts can continue to issue read and write I/O operations to V1 of DS1 during the migration process. In at least one embodiment, prior to and during the data migration, V2 can be unavailable to external hosts whereby no host I/Os can be issued to V2. The first phase for data migration can include using the snapshot difference technique to migrate content, via asynchronous replication, from V1 to V2.

In at least one embodiment, the time-based criteria can utilize i) a rate of data change or data change rate, and ii) a rate of data transfer or data transfer rate. In at least one embodiment, the foregoing rates can be averages. The data transfer rate can denote a rate at which data is transferred, copied or replicated from DS1 to DS2, such as over a replication link. The data change rate can denote the rate at which V1 changes or is written to by hosts or other storage clients, such as with respect to storage client or host write 1/Os. The foregoing average data change rate and average data transfer rate can be calculated or determined based on observed or collected information during the first phase. In at least one embodiment, the data change rate can be calculated based on one or more snapshot differences each between two corresponding successive snapshots of V1, such as snapshots N and N+1, taken in connection with the snapshot difference technique of the first phase. For example, if 500 MB of data or content is modified between snapshots N and N+1 taken 5 minutes apart whereby the corresponding replication cycle replicates or copies 500 MB of data from DS1 to DS2, the data change rate can be estimated as 500 MB/5 minutes=100 MB/minute or about 1.67 MB/second or 12.9 megabits/second. In at least one embodiment, the data transfer rate can be determined based on the amount of time it takes to transfer the data of the replication cycle, such as the foregoing 500 MB of data for snapshot N, from DS1 to DS2.

In at least one embodiment, the foregoing data change rate and data transfer rate can be ongoing cumulative averages determined based on multiple replication cycles of the first phase. In at least one embodiment, the foregoing average rates can be updated with information obtained for each replication cycle.

In at least one embodiment where the data processing application or use case is the above-noted data migration, the time-based criteria can be used in determining when to transition to the final phase of the data migration process. In at least one embodiment of data migration, it can be desirable to minimize or limit the amount of time it takes to complete the final phase of data migration, for example, to avoid any host I/O timeouts, such as for host I/Os issued but not serviced during the final phase. In at least one embodiment, the final phase of data migration can include processing to switch from V1 to V2, whereby hosts or external storage clients use V2 of DS2 rather than V1 of DS1. The techniques of the present disclosure can be used to determine whether to commence the final phase processing and thus commence the switching from V1 to V2. In at least one embodiment, the final phase of data migration can include: i) quiescing host I/Os to V1 whereby no new host I/Os directed to V1 (e.g., and received at DS1) are serviced and any in-progress host I/Os directed to V1 are allowed to complete, ii) after any remaining in-progress host I/Os to V1 have completed, taking a final snapshot of V1, performing a final snapshot difference and then performing a corresponding final copy or replication of any remaining changed V1 content (e.g., a last set of data changes to V1) such as due to in-progress host write I/Os to V1, and iii) switching host or client access from V1 of DS1 to V2 of DS2. In at least one embodiment, switching host or client access from V1 to V2 can include making V1 unavailable or inaccessible to hosts over paths to DS1, and making V2 available and accessible for I/Os to hosts over one or more paths to DS2.

In at least one embodiment where the data processing application or use case is data migration, the time-based criteria can include MAX, a maximum amount of time allowed for completing the final phase. In at least one embodiment, the average data change rate can be used to estimate or predict the expected amount of data in the final set of V1 data changes to be replicated in the last/final replication cycle and snapshot. For example, the snapshot difference technique can take a snapshot at defined time intervals such as every 5 minutes. Assume, for example, that the average data change rate is 50 MBs/minute. In this case, the techniques of the present disclosure can estimate or predict that the amount of data in the final set of V1 data changes, based on the snapshot time interval of 5 minutes and the average data change rate of 50 MBs/minute, is 250 MB (e.g., 5 minutes*50 MBs/minute=250 MB). In at least one embodiment, the average data transfer rate can be used to predict or estimate the amount of time it will take to transfer, copy or replicate the final replication cycle having an expected or predicted size of 250 MB of data from DS1 to DS2 in the final phase. For example, if the average data transfer rate is 100 MBs/second, it can be estimated that it will take about 2.5 seconds to transfer the final replication cycle or last expected set of V1 data changes. In at least one embodiment of data migration, MAX can denote the amount of time allowed for completing the entire final phase, where copying the final or last set of V1 data changes of the final replication cycle is only part of the final phase processing, and whereby as a result, any remaining or additional final phase processing can be estimated using other suitable methods.

In at least one embodiment where the data processing application or use case is data migration, if the total estimated, predicted or expected time to complete the final phase does not exceed MAX, the final phase can be performed.

In at least one embodiment where the data processing application or use case is data migration, if the total estimated, predicted or expected time to complete the final phase exceeds MAX, then the techniques of the present disclosure provide for remaining in the first phase and i) taking another subsequent snapshot N+1 of V1, ii) determining a snapshot difference between V1 successive snapshots N and N+1, and iii) replicating or copying the corresponding data changes based on the snapshot difference from DS1 to DS2 for application to V2. Also, the average data change rate and average data transfer rate can be further revised, updated or refined based on i) the most recent set of data changes corresponding to the difference between V1 snapshots N and N+1, and ii) the elapsed time it takes to transfer the most recent set of data changes from DS1 to DS2. Processing can again be repeated to i) determine a revised total expected time to complete the final phase using the updated average data change rate and updated data transfer rate, and ii) determine whether the revised total expected time exceeds MAX, in order to make a subsequent determination as to whether to proceed with the final phase or remain in the first phase in a manner as discussed above. In this manner in at least one embodiment, the techniques of the present disclosure can provide for repeatedly evaluating and determining whether to remain in the first phase of data migration or proceed to the final phase of data migration.

In at least one embodiment, the techniques of the present disclosure can further provide for use of a timer that tracks or measures i) the amount of elapsed time when actually performing the final phase, ii) the amount of elapsed time when replicating or copying the last set of V1 data changes of the last replication cycle, and/or iii) the total amount of elapsed time taken to perform the data migration. In at least one embodiment, if any of the foregoing elapsed times exceed a corresponding allowed maximum, processing can again revert back to the first phase of processing from the final phase.

In at least one embodiment, the techniques of the present disclosure can also include one or more other stopping criteria. For example in at least one embodiment, a maximum number of iterations Z can be specified denoting the maximum number of times, iterations or replication cycles performed in connection with evaluating whether to proceed to the final phase. For example, if Z=3, at most 3 cycles of snapshot differences and related evaluation of whether an estimated or predicted time for completing the final phase exceeds MAX can be performed. If the final phase is not entered or commenced after the Z cycles or iterations, then the overall data processing application or use, such as migration, can stop.

In a similar manner, the techniques of the present disclosure can also be used in connection with other suitable data processing applications or use case scenarios. In at least one embodiment, the techniques of the present disclosure can be used in connection with transitioning from asynchronous replication of V1 and V2 to another replication mode for V1 and V2. For example in at least one embodiment, the techniques of the present disclosure can use the time-based criteria based, at least in part, on the average data transfer rate and average data change rate, to determine whether to transition from an asynchronous replication mode for asynchronously replicating content of V1 and V2 as noted above to a synchronous replication mode for synchronous replication of content of V1 and V2. In at least one embodiment, before transitioning to the final phase where processing can include establishing V1 synchronously replicating to V2, it can be desirable that the expected amount of data differences of the last replication cycle or last set of V1 data changes of the final phase be estimated or predicted to complete within a maximum amount of time.

In at least one embodiment, the techniques of the present disclosure can be used in connection with transitioning from a first asynchronous replication mode for V1 and V2 to another second asynchronous replication mode for V1 and V2. In at least one embodiment, the second asynchronous replication mode can be an optimized asynchronous replication mode such as the low RPO (recovery point objective) or near zero (NZ) asynchronous replication mode discussed elsewhere herein. In at least one embodiment, the second asynchronous replication mode can perform one or more optimizations not performed by the first asynchronous replication mode in efforts to obtain, with the second asynchronous replication mode, a lower RPO than other obtained in connection with the first asynchronous replication mode.

In at least one embodiment, the techniques of the present disclosure can be used in connection with transitioning from asynchronous replication from V1 to V2 to a metro replication configuration for V1 and V2 as discussed elsewhere herein.

The foregoing and other aspects of the techniques of the present disclosure are described in more detail in the following paragraphs.

Referring to the FIG. 1, shown is an example of an embodiment of a system 11 that can be used in connection with performing the techniques described herein. The system 11 includes a data storage system 12 connected to the host systems (also sometimes referred to as hosts) 14*a*-14*n* through the communication medium 18. In this embodiment of the system 11, the n hosts 14*a*-14*n* can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14*a*-14*n* can access and communicate with the data storage system 12, and can also communicate with other components included in the system 11.

Each of the host systems 14*a*-14*n* and the data storage system 12 included in the system 11 are connected to the communication medium 18 by any one of a variety of connections in accordance with the type of communication medium 18. The processors included in the host systems 14*a*-14*n* and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14*a*-14*n* and the data storage system 12 can all be located at the same physical site, or, alternatively, can also be located in different physical locations. The communication medium 18 used for communication between the host systems 14*a*-14*n* and the data storage system 12 of the system 11 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14*a*-14*n* and the data storage system 12 are connected to the communication medium 18 can pass through other communication devices, such as switching equipment, a phone line, a repeater, a multiplexer or even a satellite.

Each of the host systems 14*a*-14*n* can perform data operations. In the embodiment of the FIG. 1, any one of the host computers 14*a*-14*n* can issue a data request to the data storage system 12 to perform a data operation. For example, an application executing on one of the host computers 14*a*-14*n* can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16*a*-16*n*. The data storage devices 16*a*-16*n* can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14*a-n*. The data storage array can include one or more RAs used, for example, to facilitate communications between data storage arrays. The data storage array can also include one or more device interfaces 23 for facilitating data transfers to/from the data storage devices 16*a*-16*n*. The data storage device interfaces 23 can include device interface modules, for example, one or more disk adapters (DAs) (e.g., disk controllers) for interfacing with the flash drives or other physical storage devices (e.g., PDS 16*a-n*). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25*b* can be used to facilitate data transfers and other communications between the device interfaces, the HAs and/or the RAs in a data storage array. In one embodiment, the device interfaces 23 can perform data operations using a system cache included in the global memory 25*b*, for example, when communicating with other device interfaces and other components of the data storage array. The other portion 25*a* is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14*a*-14*n* provide data and access control information through channels to the storage systems 12, and the storage systems 12 also provide data to the host systems 14*a-n* through the channels. The host systems 14*a-n* do not address the drives or devices 16*a*-16*n* of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22*a* that can be used to manage and monitor the data storage system 12. In one embodiment, the management system 22*a* can be a computer system which includes data storage system management software or application that executes in a web browser. A data storage system manager can, for example, view information about a current data storage configuration such as LUNs, storage pools, and the like, on a user interface (UI) in a display device of the management system 22*a*. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16*a*-16*n*. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

In at least one embodiment, reading contents stored at a logical address LA1 such as to service a read I/O in response to a read cache miss can including traversing the mapping information of the chain of metadata pages mapping the logical address to a physical location or address of the content of LA1 as stored in BE non-volatile storage.

In at least one embodiment, a write I/O that writes content C1 to LA1 can be persistently recorded, such as in a log discussed elsewhere herein, and then an acknowledgement can be returned to the issuing client. Subsequently, the recorded write I/O can be flushed from the log. Flushing the recorded write I/O can include storing C1 at a physical location or address, and then creating and/or updating corresponding mapping information that maps LA1 the physical location of C1.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22*a* to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22*a* to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2A:
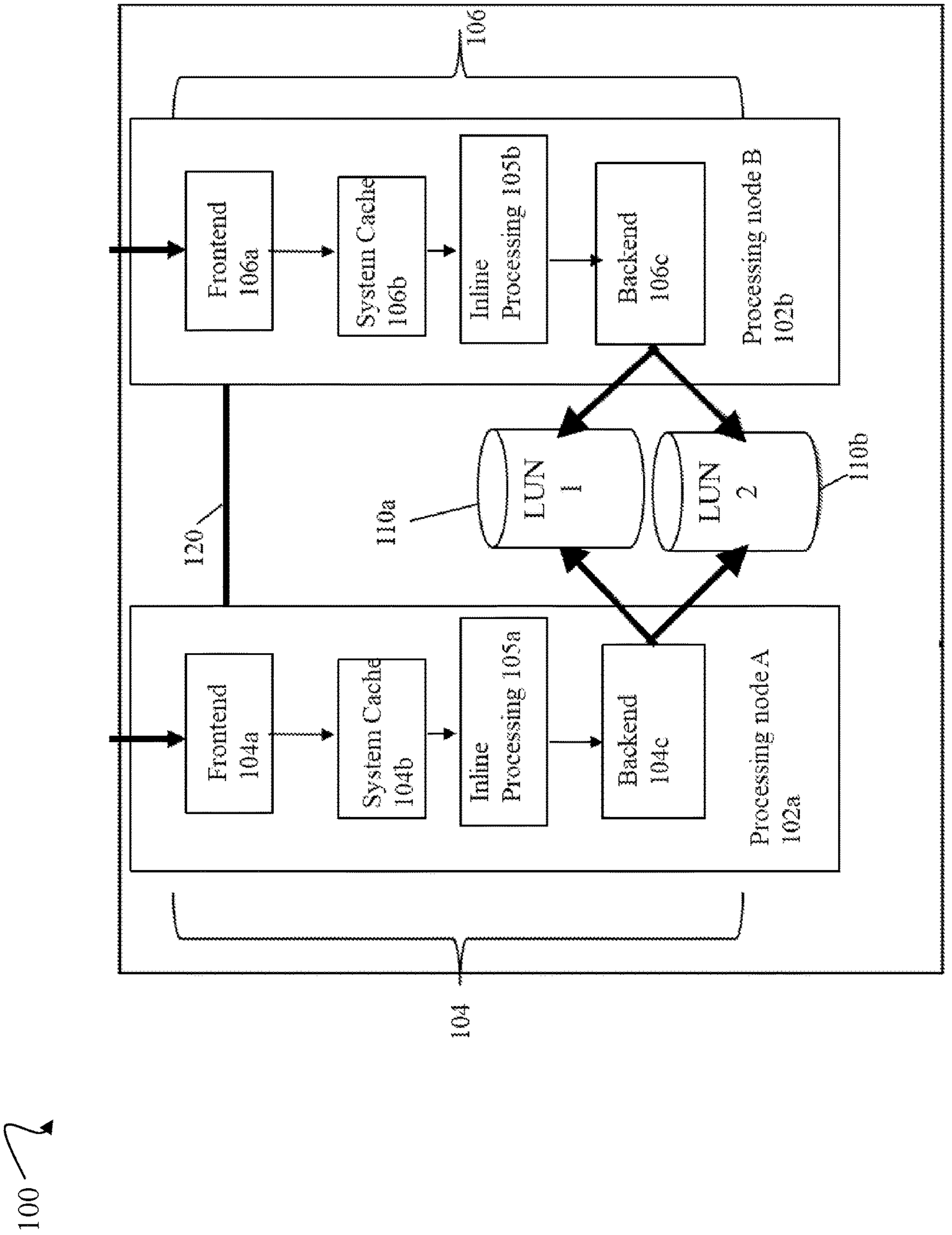
FIG. 2A is an example illustrating the I/O path or data path in connection with processing data in an embodiment in accordance with the techniques of the present disclosure.

With reference to the FIG. 2A, shown is an example 100 illustrating components that can be included in the data path in at least one existing data storage system in accordance with the techniques herein. The example 100 includes two processing nodes A 102*a* and B 102*b* and the associated software stacks 104, 106 of the data path, where I/O requests can be received by either processing node 102*a* or 102*b*. In the example 200, the data path 104 of processing node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes directed to the LUNs 110*a*, 110*b* can be received for processing by either of the nodes 102*a* and 102*b*, the example 100 illustrates what is also referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

In at least one embodiment, a persisted log can be used for logging user or client operations, such as write I/Os. In at least one embodiment, the log can also be used to log or record other operations such as operations to create and delete snapshots, such as user created snapshots, of storage objects such as volumes or logical devices.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write or other operation in the log, the write or other operation is flushed or destaged from the log. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation. More generally, once an entry of recorded operation of the log is flushed from the log, the log space of the flushed entry can be reclaimed and reused.

In the log in at least one embodiment, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
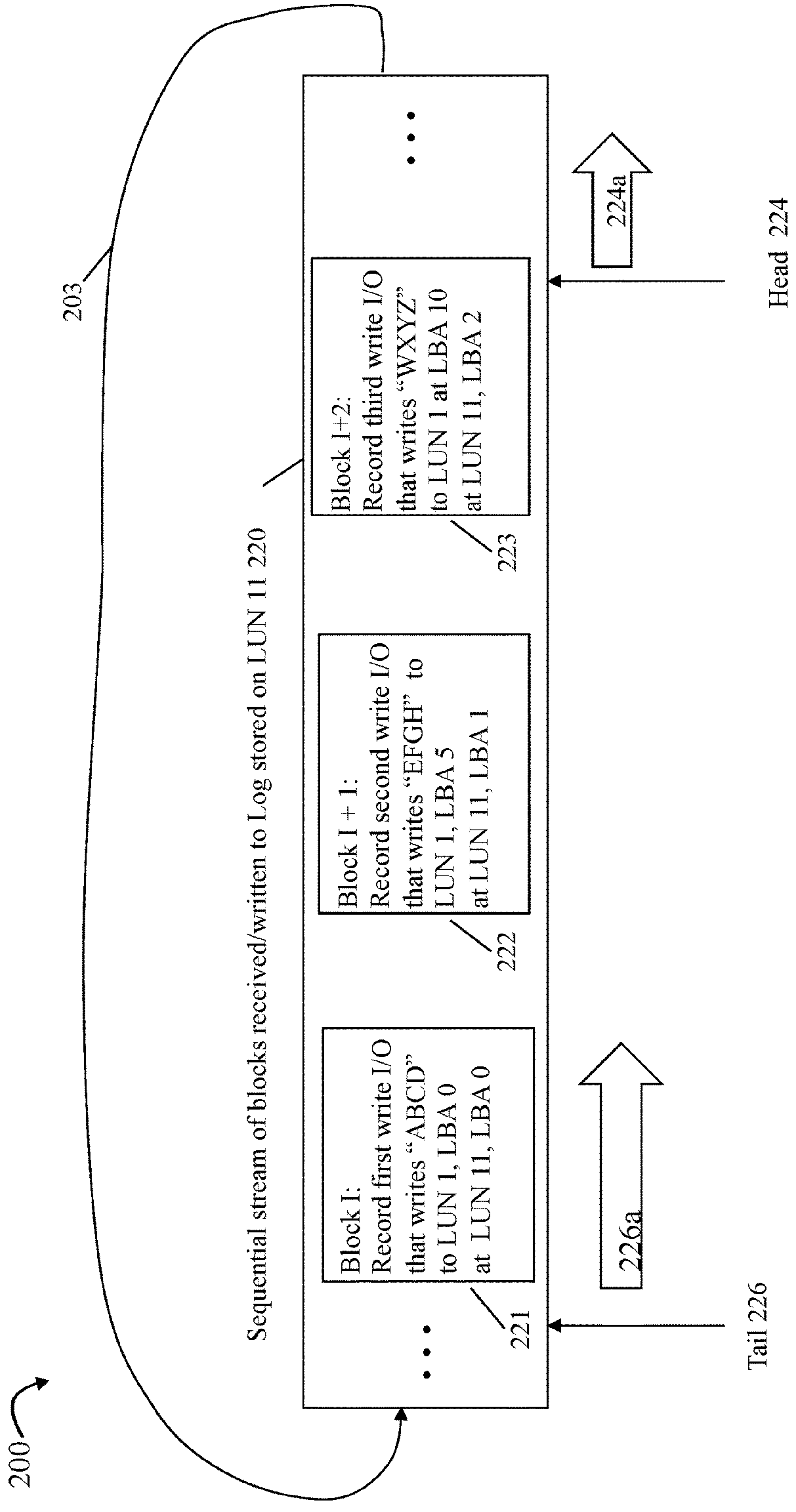
FIGS. 2B, 2C and 2D are examples illustrating use of a log file and mapping information in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks 1221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224*a* to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226*a* sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
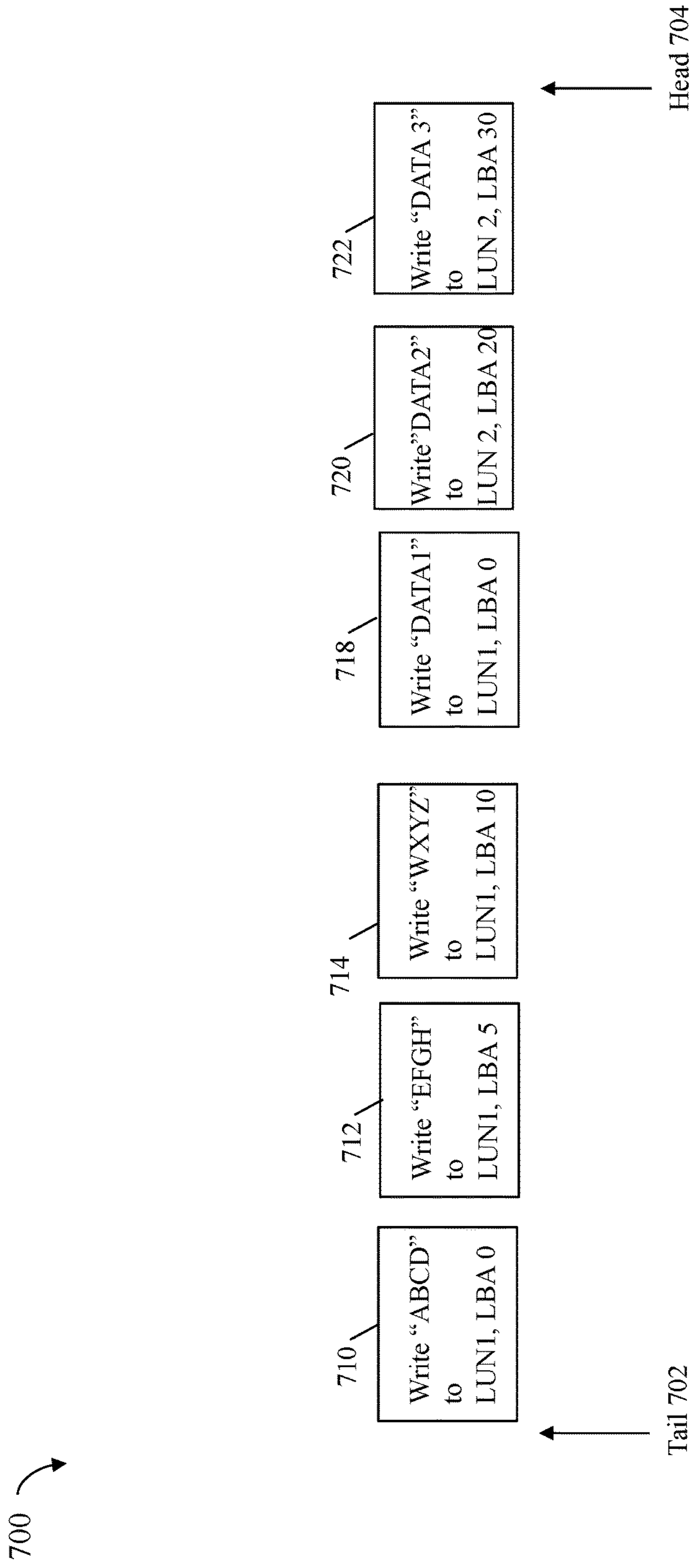

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
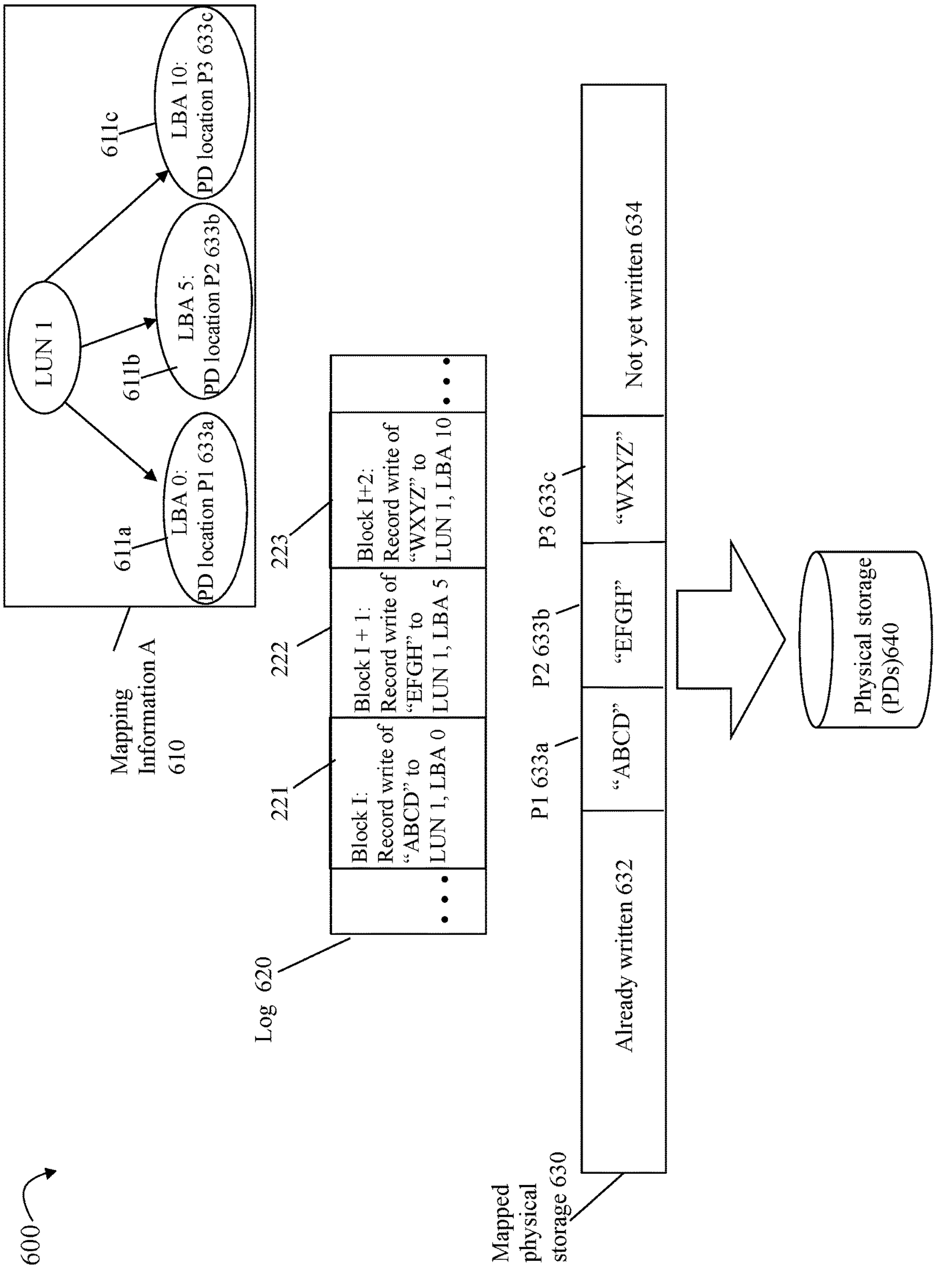

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as an asynchronous mode described elsewhere herein.

Figure 3:
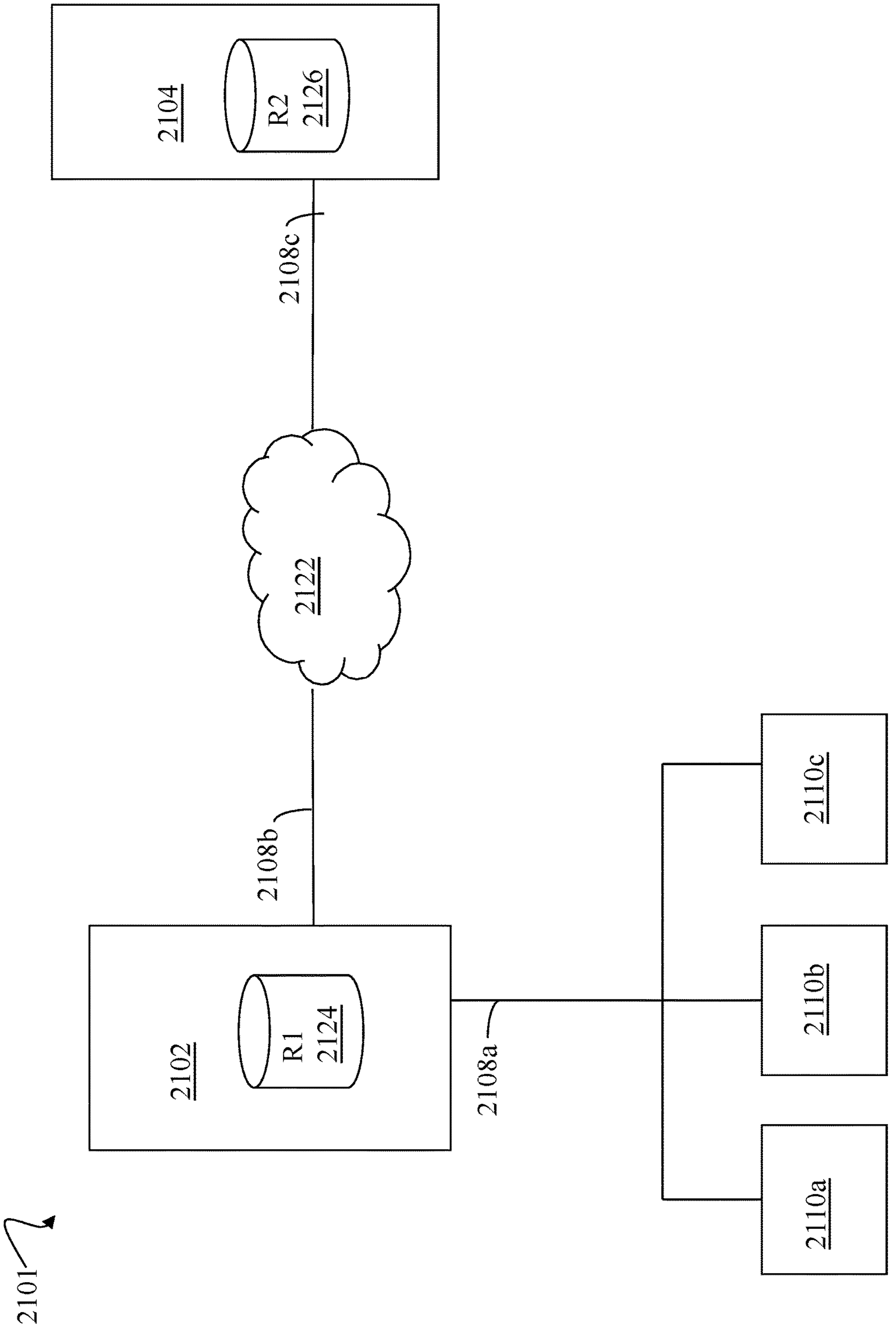
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110*a*, 2110*b* and 1210*c*. The data storage systems 2102, 2104 can be remotely connected and communicate over the network 2122, such as the Internet or other private network, and facilitate communications with the components connected thereto. The hosts 2110*a*, 2110*b* and 2110*c* can issue I/Os and other operations, commands, or requests to the data storage system 2102 over the connection 2108*a*. The hosts 2110*a*, 2110*b* and 2110*c* can be connected to the data storage system 2102 through the connection 2108*a* which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110*a*, 2110*b* and 2110*c*. The data storage system 2104 can be characterized as remote with respect to the hosts 2110*a*, 2110*b* and 2110*c*. The R1 and R2 devices can be configured as LUNs.

The host 2110*a* can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary or production storage device and a second storage device, such as R2, as a secondary storage device. In this example, the host 2110*a* interacts directly with the device R1 of the data storage system 2102, and any data changes made are automatically provided to the R2 device of the data storage system 2104 by a remote replication facility (RRF). In operation, the host 2110*a* can read and write data using the R1 volume in 2102, and the RRF can handle the automatic copying and updating of data from R1 to R2 in the data storage system 2104. Communications between the storage systems 2102 and 2104 can be made over connections 2108*b*, 2108*c* to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With asynchronous mode remote data replication in at least one embodiment, a host 2110*a* can issue a write to the R1 device 2124. The primary or R1 data storage system 2102 can generally commit the write operation. The system 2102 can commit the write operation, for example, such as by storing the write data in its cache at a cache location and marking the cache location as including write pending (WP) data as mentioned elsewhere herein. As another example, the system 2102 can commit the write operation, for example, such as by recording the write operation in a persistent transaction log. At a later point in time, the write data is destaged, such as from the cache of the R1 system 2102 or the transaction log, to physical storage provisioned for the R1 device 2124 configured as the LUN A. Once the system 2102 has committed the write, the system 2102 can return an acknowledgement to the host 2110*a* regarding completion of the write. Thus, the acknowledgement sent from the system 2102 to the host 2110*a* regarding completion of the write is sent independent of any replication or communication of the write to the remote R2 system 2104. Additionally, the RRF operating in the asynchronous mode can replicate or propagate the write across an established connection or link (more generally referred to as a the remote replication link or link) such as over 2108*b*, 2122, and 2108*c*, to the secondary or R2 data storage system 2104 where the write can be committed on the system 2104. The system 2104 can generally commit the write in any suitable manner such as similar to described above in connection with the R1 system 2102. Subsequently, the write can be destaged, for example, from the cache of the R2 system 2104 or the transaction log of the R2 system 2104, to physical storage provisioned for the R2 device 2126 configured as the LUN A. Once the R2 system 2104 has committed the write, the R2 system 2104 can return an acknowledgement to the R1 system 2102 that it has received the replicated write. Thus, generally, R1 device 2124 and R2 device 2126 can be logical devices, such as LUNs, configured as asynchronous copies of one another, where there is some acceptable level of data difference between the R1 and R2 devices and where R1 represents the most recent or up to date version. R1 and R2 devices can be, for example, fully provisioned LUNs, such as thick LUNs, or can be LUNs that are thin or virtually provisioned logical devices.

Figure 4:
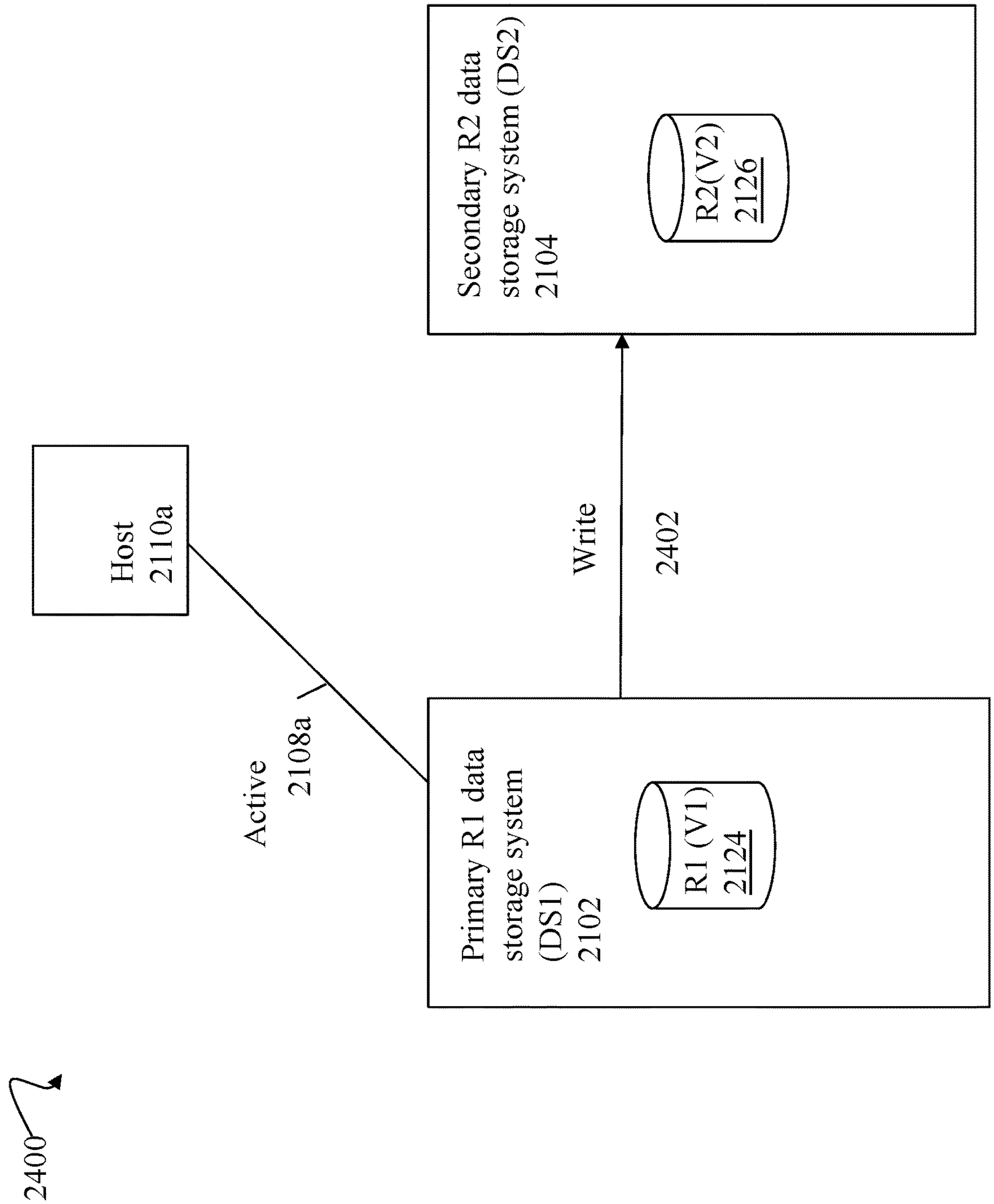
FIG. 4 is an example illustrating a replication configuration in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2A. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in asynchronous replication mode in the embodiment of FIG. 4, the host 2110*a* issues a write, or more generally, all I/Os including reads and writes, over a path to only the primary R1 data storage system 2102. The host 2110*a* does not issue I/Os directly to the R2 data storage system 2104. The configuration of FIG. 4 is a configuration with asynchronous replication performed from the R1 data storage system 2102 to the secondary R2 system 2104. With the configuration of FIG. 4, the host 2110*a* has an active connection or path 2108*a* over which all I/Os are issued to only the R1 data storage system. Writes issued over path 2108*a* to the R1 system 2102 can be asynchronously replicated to the R2 system 2104.

In at least one embodiment of the configuration of 2400, the R1 device 2124 (e.g., volume V1) and the R2 device 2126 (e.g., the volume V2) can be configured as an asynchronous volume pair where writes to V1 2124 are automatically asynchronously replicated to the R2 system 2104 and applied to the target volume V2 2126. Thus in the example 2400, the host 2110*a* can have write access over the active path 2108*a* to the source or R1/V1 volume (2124) but have no direct write access to the target or R2 volume (2126).

In at least one embodiment, the target volume or R2 volume 2126 can be used in the event of a failure of any one or more of: the host 2110*a*, link 2108*a* and/or system 2102. Although not illustrated in FIG. 4, another second host can be connected to the system 2104 where the second host can use the target volume or R2 volume 2126 due to the foregoing failure.

It should be noted although only a single replication link 2402 is illustrated, more generally any number of replication links can be used in connection with replicating data from systems 2102 to system 2104.

Although examples in the following paragraphs refer to a volume or LUN, more generally, the techniques of the present disclosure can be generalized for use with a storage object or resource which can be a volume or LUN, one or more file systems, a virtual volume or vvol used in connection with virtual machines, one or more files, one or more directories of files or other object, and any other suitable storage resource or object.

Generally, the primary or R1 storage system 2102 can also be referred to as a source system or site; the secondary or R2 storage system 2104 can also be referred to as a destination, target or disaster recovery (DR) system or site; the R1/V1 device 2124 can also be referred to as a production or source volume or LUN having a corresponding R2/V2 device 2126 which can also be referred to as a target, destination or replica volume or LUN.

Consistent with discussion above, the RRF or remote replication facility can perform asynchronous replication for a configured pair of volumes, resources or objects in at least one embodiment. The asynchronous replication configuration can be generally as discussed herein such as the asynchronous remote replication configuration as in FIG. 4.

Figure 5A:
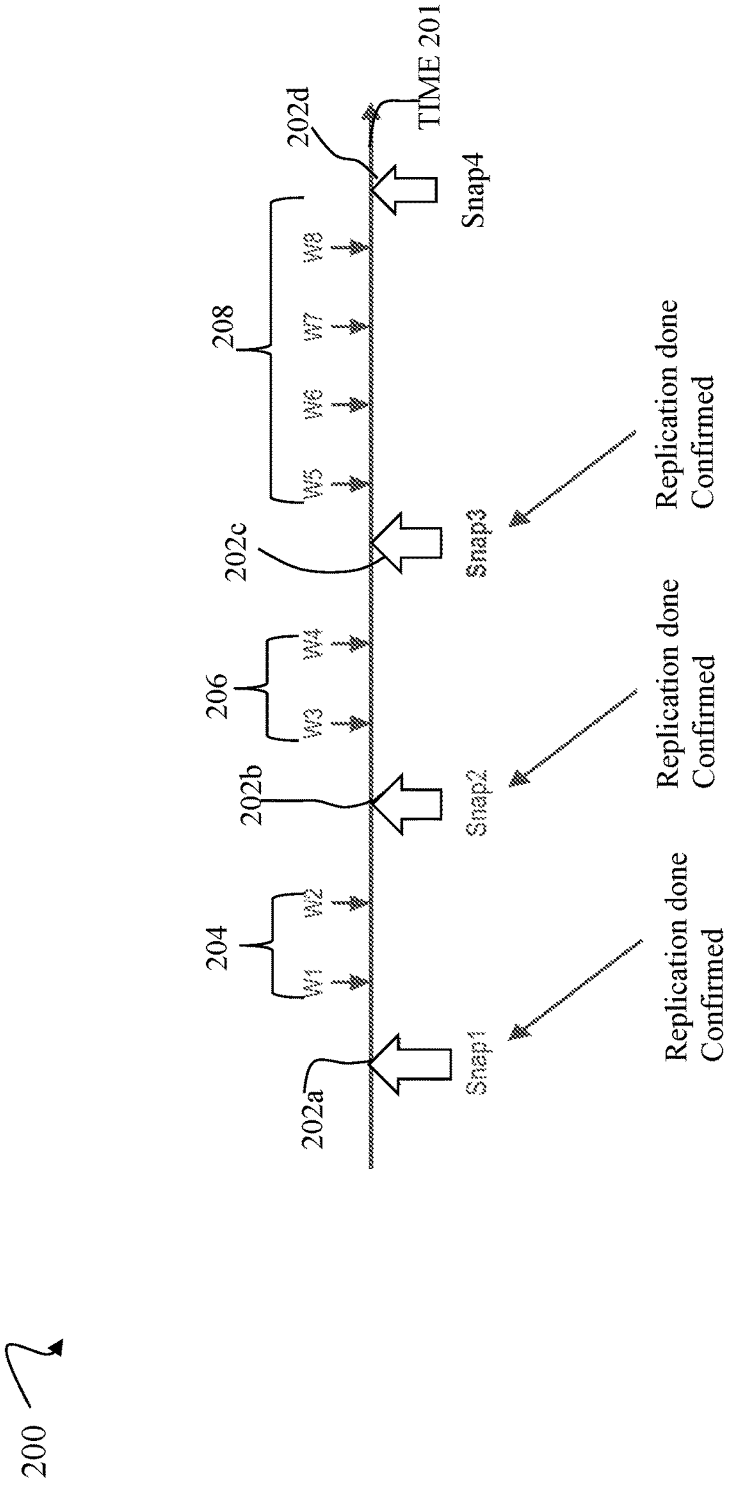
FIG. 5A is an example illustrating determining data differences for a replication configuration in at least one embodiment in accordance with the techniques of the present disclosure.

Referring to FIG. 5A, shown is an example 200 illustrating general use of replication related or snapshots in connection with asynchronous replication for volume pair (V1, V2), such as with the snapshot difference technique, in at least one embodiment in accordance with the techniques of the present disclosure.

The example 200 illustrates replication related snapshots 202*a-d* of a storage object such as a source volume V1 of a source storage system taken at various points in time along a timeline 201. The snapshot snap1 202*a* is taken at a first point in time P1 and can be marked as a replication related snapshot. The snapshot snap2 202*b* is taken at a second point in time P2 (subsequent to taking snap1 202*a* at P1) and can be a marked as a replication related snapshot. The snapshot snap3 202*c* is taken at a third point in time P3 (subsequent to taking snap2 202*b* at P2) and can be marked as a replication related snapshot. The snapshot snap4 202*d* is taken at a fourth point in time P4 (subsequent to taking snap3 202*c* at P3).

The writes W1 and W2 of 204 denote the writes occurring between taking snapshots 202*a* and 202*b*, whereby writes of 204 denote data changes between snapshots 202*a-b*. The writes W3 and W4 of 206 denote the writes occurring between taking snapshots 202*b* and 202*c*, whereby the writes of 206 denote data changes between snapshots 202*b-c*. The writes W5-W8 of 208 denote the writes occurring between taking snapshots 202*c* and 202*d* whereby the writes of 208 denote data changes between the snapshots 202*c-d*.

The writes 204 can denote the replicated writes of a single asynchronous replication cycle between snapshots 202*a-b*; the writes 206 can denote the replicated writes of a single asynchronous replication cycle between snapshots 202*b-c*; and the writes 208 can denote the replicated writes of a single asynchronous replication cycle between the snapshots 202*c-d*.

In at least one embodiment, the writes 204 can be included in the snapshot 202*b*; the writes 206 can be included in the snapshot 202*c*; and the writes 208 can be included in the snapshot 202*d*.

In at least one embodiment, processing of the snapshot difference technique can include continually taking replication related snapshots or snaps of a source volume V1; determining the changed content or data written (and corresponding logical addresses or locations of V1 modified or written) in each replication cycle between two successive replication related snapshots; and replicating the data changes and corresponding V1 locations of the replication cycle from the source system to the target system.

In at least one embodiment, the data differences or changed content can be determined, replicated or written to the target system, and then applied to the corresponding target volume (e.g., V2 of the target system).

Figure 5B:
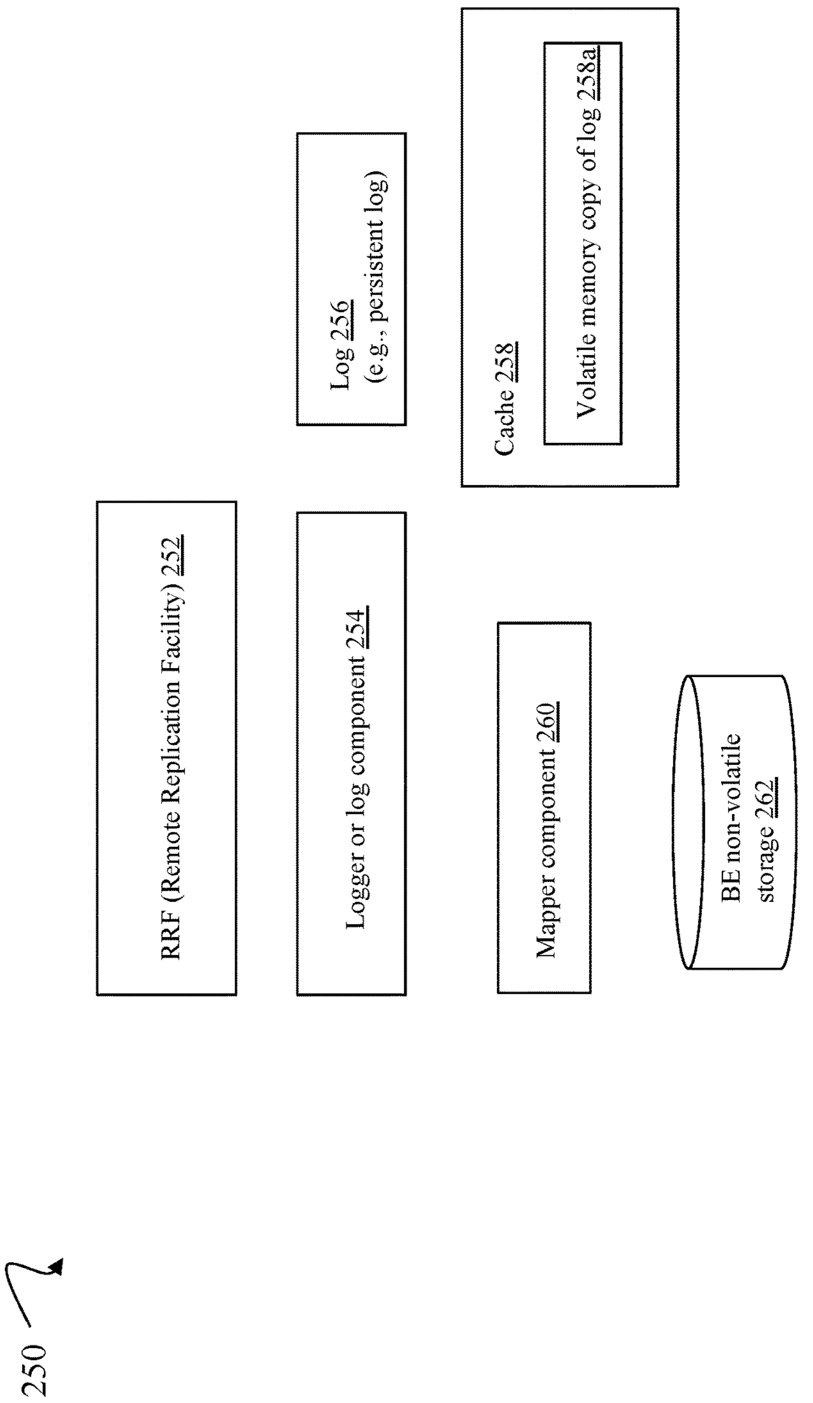
FIGS. 5B, 6, and 11 are examples of components that can be used in at least one embodiment in accordance with the techniques of the present disclosure.

Referring to FIG. 5B, shown is an example 250 of components on a storage system that can be used in an embodiment in accordance with the techniques of the present disclosure.

In at least one embodiment the components of 250 can be included in the source storage system configured to perform asynchronous replication in accordance with the present disclosure.

The components 250 can include a remote replication facility or RRF 252, a logger or log component 254, a mapper component 260, a log 256 denoting a persistently stored log of recorded operations, a cache 258, and BE non-volatile storage 262. The cache 258 can generally be a volatile memory cache and can include a volatile memory copy 258*a* of the log 256. Put another way, in at least one embodiment, element 258*a* can denote an in-memory copy of the log 256, where the in-memory or volatile memory copy 258*a* can include the same information as the persistent log 256. In at least one embodiment, the copy 258*a* of the log can be accessed and used to perform processing described herein rather than the persistent copy 256 of the log. In at least one embodiment, the copy 258*a* of the log can have a corresponding layout and organization of content that can be different from the persisted log 256, where the organization of 258*a* can be designed for quicker retrieval, updating and/or management than that of the persisted log 256. In at least one embodiment, the persisted log 256 can be used in the event of system failure or reboot to repopulate the volatile memory copy 258*a* of the log. In at least one embodiment, committing a record or transaction to the log, such as part of ingest processing of a command or operation, can include storing corresponding records in both the persisted log 256 and the volatile memory copy 258*a* of the log. In at least one embodiment with a dual node system, committing a record or transaction to the log can also include communicating the committed or recorded operations between the peer nodes to ensure that both nodes have synchronized volatile memory copies of the log.

In at least one embodiment of a dual node system, each node can include node-local instances of 252, 254, 258, and 260. In at least one embodiment of a dual node system, there can be a single persistent log 256 accessed and used by both nodes. Additionally, the storage 262 can denote BE non-volatile storage accessed and used by both nodes.

The RRF 252 can be configured to perform various modes of replication including, for example, asynchronous replication using the snapshot difference technique discussed elsewhere herein.

The mapper component 260, sometimes referred to as the mapper, can maintain mapping information of metadata pages used to map logical addresses, such as of user data or content, to corresponding physical addresses or locations of content stored at the logical addresses. The physical addresses or locations can correspond to storage locations in the BE non-volatile storage 262. Consistent with other discussion herein in at least one embodiment, the metadata pages can be organized in a hierarchal tree structure of multiple layers of metadata pages. In at least one embodiment, the hierarchical structure of multiple layers of metadata (MD) pages can include a layer of top MD pages, a layer of mid MD pages, a layer of leaf MD pages, where each top page can include pointers to multiple mid pages, each mid page can include multiple pointers to multiple leaf pages. Each leaf page can include multiple entries each associated with a logical address, where the leaf page entry for a logical address can include a reference, pointer, or address used to access a physical storage location of 262 containing content of the logical address. In at least one embodiment, the reference of the leaf page entry for a logical address can be an indirect pointer to the physical storage location of content stored at the logical address. In at least one embodiment, the mapping information mapping a logical address LA1 to a corresponding physical location PA1 of content stored at LA1 can include a chain of the metadata pages including top, mid and leaf MD (metadata) pages, where the top page points to a mid page, and where the mid page points to a leaf page, and where an entry of the leaf page includes the indirect pointer to PA1. In at least one embodiment, flushing a recorded write I/O of the log where the write I/O writes content C1 to LA1 can include: storing C1 at PA1; and creating and/or updating the mapping information of the chain of metadata pages used to map LA1 to PA1.

The log component 254 can be configured to: record operations, commands or requests in the log 256, 258*a*; enforce constraints and dependencies between various operations that can be recorded in the log; and control flushing of the log 256, 258*a* to the mapper component 260.

In at least one embodiment, ingest processing of a write I/O and a snapshot related command (e.g., to create a snapshot of a volume or storage object) can include recording (e.g., committing) the command or operation in the log. Once the foregoing is recorded in the log, an acknowledgement can be returned to the client or originator of the command or operation just recorded in the log.

In at least one embodiment, the RRF 252 can be a client originating the command to create a replication related snapshot. In at least one embodiment, write I/Os directed to a source volume configured for asynchronous replication can be received at the storage system from a host or other external storage client. Subsequently, recorded operations or commands of the log can be flushed such as by the logger or log component 254. In at least one embodiment, flushing a recorded write I/O that writes content C1 to a first logical address LA1 can include: persistently storing C1 at a physical address or location PA1 on BE non-volatile storage 262; and creating and/or updating corresponding mapping information mapping LA1 to PA1.

Consistent with other discussion herein, data storage systems can perform different data services such as remote data replication (also referred to as remote replication). Generally remote replication provides for replicating data from a source system to a remote target system. For example, data on the source system can be a primary copy of a storage object which is remotely replicated to a counterpart remote target storage object on the remote target system. The remote storage target object can be used, for example, in the event that the primary copy or source data storage system experiences a disaster where the primary copy is unavailable. Generally, remote replication can be used for any suitable purpose to increase overall system reliability and data availability. Remote data replication can be performed in a continuous ongoing manner where data changes or writes made to a source object on the source system over time can be automatically replicated to a corresponding remote target storage object on the remote target system.

The source storage system can present data storage resources or objects, such as a volume or logical device, to a client, such as a host. A replication session can be defined for a volume pair including a source volume V1 of the source storage system and a target volume V2 of the target storage system, where the replication session can be further characterized as one-way replication where, as noted above, writes to the source volume V1 are automatically replicated in a continuous ongoing manner to the target volume V2. In at least one embodiment, V1 can be exposed to an external host over paths from the source storage system and V2 may not be exposed to the host such that the host can issue I/Os to V1 over paths to the source storage system but cannot issue I/Os directly to V2 on the target storage system.

One mode or methodology of one-way remote replication can be referred to as asynchronous remote replication (sometimes referred to as asynchronous replication) where a recovery point objective or RPO is specified. The RPO for a particular asynchronous remote replication configuration or session can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote or target storage object on the target system is allowed to be with respect to the source or primary copy of the storage object on the source system. Thus, with asynchronous replication configured for a source storage object and a remote or target storage object, the remote or target storage object and the source storage object can denote different point in time copies. The source storage object denotes the most up to date version of the storage object and the remote or target storage object denotes an earlier or prior version of the storage object than the source storage object. The RPO can be specified at a time granularity that can range typically, for example, from hours to a number of minutes.

In at least one embodiment, asynchronous replication can capture data changes or differences to be copied from the source storage object or volume, such as V1, to the target storage object or volume, such as V2, in repeated cycles using a snapshot difference technique. A snapshot of a storage object such as a volume or logical device can be defined as a point in time version of the storage object, where the snapshot captures the state of the storage object, such as with respect to the current content of the storage object, when the snapshot is taken. The snapshot difference technique can be utilized where the source system continually takes successive snapshots of the source storage object at a specified defined rate or frequency based on the defined RPO. The snapshots can sometimes be referred to as transient snapshots or replication related snapshots in that they are used only internally in the source system for asynchronous replication purposes. The source system can determine a difference in content between the current snapshot N of the source storage object and the immediately prior snapshot N-1 of the source storage object, where the data changes replicated to the target system correspond to the difference in content between the snapshots N and N-1 of the source storage object. Thus, the difference in content between each pair of successive snapshots can denote the set of data changes or writes that is replicated from the snapshot N of the source object to the target storage object of the target system. In at least one version of the snapshot difference technique, processing can be performed that includes creating the two successive snapshots N-1 and N, and then subsequently deleting the two snapshots created solely for the purposes of replication.

What will now be described is at least one embodiment of the techniques of the present disclosure in connection with performing data migration from V1 of DS1 to V2 of DS2. In at least one embodiment, the data migration process can include performing a first phase and then transitioning from the first phase to a final phase. After completion of the final phase in at least one embodiment, the data migration can be complete where V2 is fully synchronized with V1 with respect to content.

Figure 6:
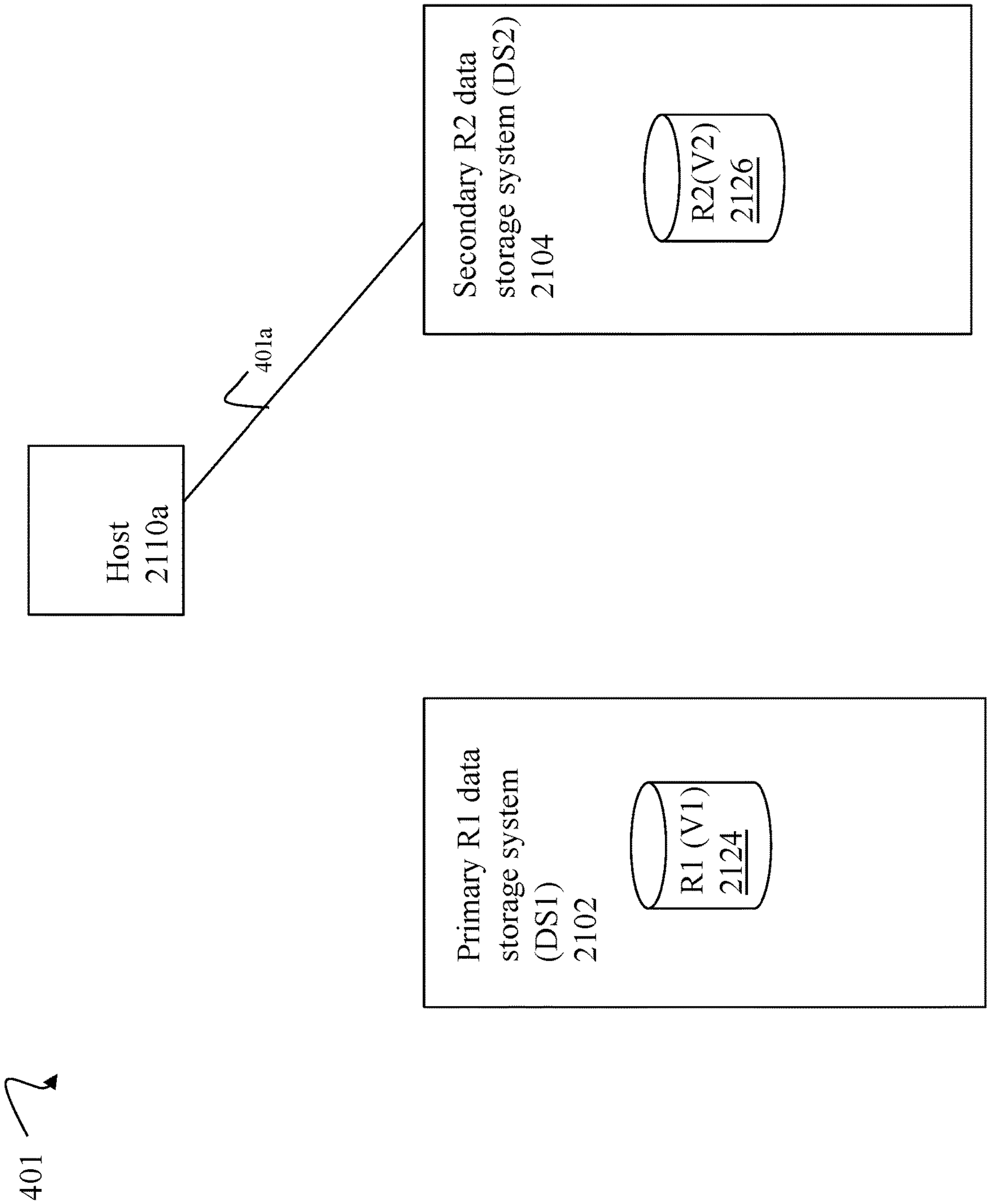

In connection with data migration as the data processing application or use case, reference is made back to FIG. 4. FIG. 4 can represent the state of the system during the first phase of performing data migration. The first phase can include performing asynchronous replication using the snapshot difference technique. With reference back to FIG. 4, both before performing the first phase and also during the first phase, the host 2110*a* may be able to send I/Os to V 2124 of DS1. With reference to the example 401 of FIG. 6, after the data migration, and thus after the first and final phases thereof, have completed, the V2 can be a duplicate in terms of content of V1, and the host 2110*a* may be able to send I/Os to V2 2126 over path 401*a* to V2 2126 of DS2 2104. In the example 401, the host 2110*a* may be no longer able to send I/Os to V1 2124 of DS1 2102. Additionally in at least one embodiment as illustrated in FIG. 6 after the data migration has completed, asynchronous replication between V1 DS1 2102 and V2 of DS2 2104 can be disabled or removed.

In connection with data migration, as well as other possible use cases or data processing applications, when data across the two sites or systems DS1 2102 and DS2 2104 must be synchronized, the snapshot difference technique can be used in connection with i) the first phase including an initial synchronization of V2 to a first version of V2 at an initial or first point in time, as well as one or more subsequent synchronizations of V2 to a corresponding version of V1 at one or more corresponding points in time, and ii) the final phase that includes performing a final synchronization of V1 and V2. In at least one embodiment of data migration, there can be a need to minimize the time taken for the final phase that includes switching from V1 to V2 with respect to external host usage. In at least one embodiment consistent with other discussion herein, during the final phase to switch from V1 to V2, there can be a quiesce of host I/Os and the final synchronization, to get V1 and V2 to be fully synchronized. As discussed in more detail elsewhere herein in connection with at least one embodiment of data migration, an initial snapshot or snap of V1 as well as one or more additional snapshots of V1 can be copied in an asynchronous manner. Subsequently the final phase can be performed to switch or switchover from V1 to V2. Part of the final phase can include performing a final synchronization of copying over a final set of V1 data changes of a final replication cycle. It can be desirable to limit the amount of time taken to perform the final phase or switchover from V1 to V2 in connection with data migration. As discussed in more detail below, the techniques of the present disclosure can be utilized in at least one embodiment to determine when to transition from the first phase of data migration to the final phase of data migration. Additionally, in at least one embodiment the techniques of the present disclosure can be utilized to provide a timer that measures elapsed time in connection with performing the final phase. In at least one embodiment, the timer and elapsed time measurement can be characterized as an additional safety precaution taken, for example, to handle unexpected event occurrences that can result in undesirably and unexpectedly extending the amount of elapse time of the final phase.

What will now be described is use of the techniques of the present disclosure in connection with at least one embodiment of data migration.

In at least one embodiment during the data migration process, the one more external clients such as the host 2110*a* can continue to issue read and write I/Os to V1 of DS1. Thus, there can be ongoing writes or data changes to V1 during the data migration while processing is performed to replicate or copy content of V1 to V2, such as in the first phase.

In the first phase, an initial synchronization of V1 and V2 can be performed. The initial synchronization can include taking a snapshot Snap1 of V1 denoting all content or data of V1. In this example, Snap 0 can denote an empty volume V1 as prior to performing any writes to V1. In at least one embodiment, the snapshot difference technique can be used to determine the content of the first replication cycle R1 between Snap 0 and Snap 1 of V1, where R1 can include all content or data of V1.

The content of R1 can be replicated or copied from DS1 to DS2 in a first transfer over the replication link or connection 2402 (e.g., FIG. 4) and applied to V2 of DS2. In at least one embodiment, there can also be additional non-replication related snapshots also transferred from DS1 to DS2 when copying the content of R1 from DS1 to DS2. In at least one embodiment, such additional snapshots can include a common-base or recovery snapshot of V1 and/or a user-created snapshot of V1. Based on the particular embodiment, the content of R1 can include the data or content of V1 as well as further information, such as checkpoint or barrier instructions, identifying the particular data or content of the one or more additional non-replication related V1 snapshots.

In at least one embodiment, V2 can be empty and not include any content prior to the initial synchronization. Thus the initial synchronization of V1 and V2 can be characterized as a full synchronization of V1 and V2 with respect to the content of V1 at the point in time when Snap1 V1 is taken.

The initial synchronization of V1 can take some time such as, for example, 20 minutes since the initial synchronization is a full copy of the content of V1 up to the point where Snap1 is taken.

Calculations can be performed based on the initial synchronization of Si. In particular, processing can calculate a data change rate and a data transfer rate for the replication cycle R1.

Let D1 denote the size or amount of V1 data changes in the replication cycle R1 between snapshots snap 0 of V1 and snap 1 of V1. In at least one embodiment, processing can be performed to determine an amount of elapsed time E1 during which the V1 data changes or writes of R1 are received by DS1. In at least one embodiment for the initial synchronization, E1 can be estimated based on the amount of time V1 has been written to by storage clients, such as hosts. In at least one embodiment, E1 can be the amount of elapsed time since V1 has been configured for use by the hosts or storage clients.

An initial data change rate can be calculated as D1/E1 to thereby denote a data rate, such as in MBs/second, at which content changes on V1. Put another way, the data change rate can denote a data rate at which hosts or storage clients write to V1. In at least one embodiment, processing can be performed to determine an average data change rate that is a cumulative average of data change rates determined for corresponding replication cycles. More generally, an embodiment can track the average data change rate that can be similarly updated with each transfer or copying of V1 data changes for each replication cycle, where each replication cycle denotes a snapshot difference between two successive V1 snapshots. In at least one embodiment, the average data change rate can initially be the initial data change rate of replication cycle In at least one embodiment, the data change rate for R1 may be omitted and not be calculated or used in connection with determining the average data change rate. Put another way in at least one embodiment, although the data transfer rate for R1 (e.g., the initial synchronization) can be used in connection with determining the average data transfer rate, the data change rate for R1 (e.g., the initial synchronization) may be omitted since it corresponds to the initial synchronization of all writes to V1 over a time period from when V1 was created or first used for storing client data.

In at least one embodiment, the data change rate can be determined with respect to the V1 data changes or writes of a corresponding replication cycle Rn between successive snapshots snap N−1 of V1 and snap N of V1 as expressed in EQUATION 1 below:

$$\text{data change rate } Rn = Rn \text{ size}/Rn \text{ duration} \qquad \text{EQUATION 1}$$

where:

- data change rate Rn denotes the data change rate for replication cycle Rn;
- Rn size denotes the size of the V1 data changes or writes of the replication cycle Rn; and
- Rn duration denotes the elapsed time (e.g., window or amount of time) during which the Rn data changes or writes to V1 of replication cycle Rn are received at DS1. Rn can denote the amount of time between the two successive snapshots of the replication cycle Rn.

In at least one embodiment, processing can be performed to determine a first transfer time T1 (e.g., elapsed time) taken to copy or transfer the V1 content of the replication cycle R1 from DS1 to DS2. For example, the amount of time T1 can be 20 minutes as noted above. An initial data transfer rate can be determined based on T1 and also D1, where D1, as noted above, denotes the amount of V1 data or content of R1 copied from DS1 to DS2 during T1. In particular, the initial data transfer rate can be calculated as D1/T1. In at least one embodiment, processing can be performed to determine an average data transfer rate denoting a cumulative average data transfer rate for data transferred over the replication link from DS1 to DS2 during corresponding replication cycles. More generally, an embodiment can track the average data transfer rate that can be similarly updated with each transfer or copying of V1 data changes for each replication cycle, where each replication cycle denotes a snapshot difference between two successive V1 snapshots. In at least one embodiment, the average data transfer rate can initially be the initial data transfer rate of the foregoing first transfer.

In at least one embodiment, the data transfer rate can be determined with respect to the V1 data changes or writes of a corresponding replication cycle Rn between successive snapshots snap N−1 of V1 and snap N of V1 as expressed in EQUATION 2 below:

$$\text{data transfer rate } Rn = Rn \text{ size}/Rn \text{ transfer time} \qquad \text{EQUATION 2}$$

where:

- data transfer rate Rn denotes the data transfer rate for replication cycle Rn;
- Rn size denotes the size of the V1 data changes or writes of the replication cycle Rn; and
- Rn transfer time denotes the elapsed time or amount of time it takes to transfer the Rn size or amount of V1 data changes or writes of replication cycle Rn from DS1 to DS2 over the replication link between DS1 and DS2.

Also while copying the content of R1 during the 20 minutes of elapsed transfer time of T1, a first set of additional host write I/Os directed to V1 can be received and serviced by DS1. Assume that another snapshot snap 2 of V1 is taken after the first transfer time of 20 minutes (e.g., T1) has elapsed such that the first set of additional host write I/Os are included in snap 2 of V1. Assume the first set of additional host write I/Os, as received during the foregoing 20 minutes, write a total amount of data denoted by D2. For example, D2 can be 1000 MBs. The first set of additional host write I/Os having a total size D2 can be the V1 data changes or writes of the second replication cycle R2, where the V1 data changes of R2 are replicated or copied in a second transfer over the replication link from DS1 to DS2. The data changes of R2 can then be applied to V2. For the replication cycle R2, the snapshot difference technique can be used to determine the V1 data changes or writes between snap1 of V1 and snap 2 of V1.

Processing can be performed to determine a data change rate and a data transfer rate for the replication cycle R2. Additionally, processing can be performed to: i) determine an updated value for the average data change rate based on the data change rate for R2, and ii) determine an updated value for the average data transfer rate based on the data transfer rate for R2.

The data change rate for R2 can be calculated as D2/T1. Additionally in at least one embodiment, processing can determine an updated average data change rate as an average of i) the data change rate of R1 (which is currently equal to the average data change rate), and ii) the data change rate of R2. More generally, the average data change rate determined for replication cycle Rn can be determined based, at least in part, on i) the average data change rate for the replication cycle R N−1 (e.g., as prior to updating), and ii) the data change rate for replication cycle RN. For example in at least one embodiment, the average data change rate for replication cycle Rn can be as expressed in EQUATION 3 below:

$$\text{average data change rate } Rn = \frac{\text{total amount of } V1 \text{ data changes in replication cycles } R1-Rn}{\text{total time duration}}$$

where:

- "average data change rate Rn" denotes the replication cycle N for which the average data change rate is being determined;
- "total amount of V1 data changes in replication cycles R1-Rn" denotes the cumulative total amount of V1 data changes or writes in replication cycles R1-Rn; and
- "total time duration" denotes the cumulative total amount of time that elapsed during the replication cycles R1-Rn.

In at least one embodiment, processing can be performed to determine an average data change rate, such as in EQUATION 3, that is a cumulative of data change rates determined for multiple corresponding replication cycles. As a variation the average data change rate Rn can be determined by taking the average of all data change rates considered. In at least one embodiment, the average data change rate can initially be the initial data change rate as noted above. More generally, an embodiment can track the average data change rate that can be similarly updated with each transfer or copying of V1 data changes for each replication cycle, where each replication cycle denotes a snapshot difference between two successive V1 snapshots.

Processing can determine a second amount of time E2 (e.g., elapsed time) taken to copy the V1 data changes of R2 from DS1 to DS2 in the second transfer. For example, E2 can be 5 minutes. For the second transfer, a corresponding second data transfer rate can be determined as D2/E2. In at least one embodiment processing can be performed to determine an updated value for the average data transfer rate that is a cumulative average of data transfer rates, such as an average of the foregoing i) initial or first data transfer rate of the first transfer and ii) the second data transfer rate of the second transfer. More generally, an embodiment can track the average data transfer rate that can be similarly updated with each transfer or copying of V1 data changes for each replication cycle, where each replication cycle denotes a snapshot difference between two successive V1 snapshots.

More generally, the average data transfer rate determined for replication cycle Rn can be determined based, at least in part, on i) the average data transfer rate for the replication cycle R N−1 (e.g., as prior to updating), and ii) the data transfer rate for replication cycle Rn. For example in at least one embodiment, the average data transfer rate for replication cycle Rn can be as expressed in EQUATION 4 below:

$$\text{average data transfer rate } Rn = \frac{\text{total amount of } V1 \text{ data in replication cycles } R1-Rn}{\text{total time duration}}$$

where:

- "average data transfer rate Rn" denotes the replication cycle N for which the average data transfer rate is being determined;
- "total amount of V1 data in replication cycles R1-Rn" denotes the cumulative total amount of V1 data changes or writes in replication cycles R1-Rn; and
- "total transfer time" denotes the cumulative total amount of time taken (e.g., elapsed) in connection with transferring, from DS1 to DS2, the "total amount of V1 data in replication cycles R1-Rn".

In at least one embodiment, processing can be performed to determine an average data transfer rate, such as in EQUATION 4, that is a cumulative of data change rates determined for multiple corresponding replication cycles. As a variation the average data transfer rate Rn can be determined by taking the average of all data transfer rates considered. In at least one embodiment, the average data transfer rate can initially be the initial data transfer rate as noted above. More generally, an embodiment can track the average data transfer rate that can be similarly updated with each transfer or copying of V1 data changes for each replication cycle, where each replication cycle denotes a snapshot difference between two successive V1 snapshots.

More generally, for each replication cycle Rn, at least one embodiment can determine: i) a corresponding data change rate such as using EQUATION 1, ii) a corresponding data transfer rate such as using EQUATION 2, iii) an updated or revised average data change rate such as using EQUATION 3, and iv) an updated or revised average data transfer rate such as using EQUATION 4.

After transferring or replicating the V1 data changes of the replication cycle R2, processing can be performed to determine, based at least in part, on the average data change rate and the average data transfer rate, whether to commence performing the final phase of data migration. In at least one embodiment, processing can be performed to estimate or predict, based on the average data change rate and the average data transfer rate, an amount of time expected to complete the final phase. If the predicted or expected amount of time for completing the final phase does not exceed a specified maximum amount of time, MAX, allowed for completing the final phase, then the final phase of the data migration processing can be performed. Otherwise If the predicted or expected amount of time for completing the final phase exceeds a specified maximum amount of time, MAX, allowed for completing the final phase, then one or more additional iterations of the first phase can be performed.

In at least one embodiment, each one or more additional iterations or replication cycles of the first phase can include: i) taking a next snapshot Snap N of V1; ii) using the snapshot difference technique to determine a corresponding set of V1 data changes or writes of replication cycle N corresponding to the V1 data changes between successive snapshots Snap N and Snap N−1 of V1; iii) replicating or transferring, over the replication link from DS1 to DS2, the V1 data changes of replication cycle N; iv) determining updated values for the average data change rate and the average data transfer rate based on replication cycle N and its transfer; v) determining a revised predicted amount of time expected to complete the final phase; and vi) evaluating the revised predict amount of time expected to complete the final phase to determine whether or not it exceeds MAX.

The foregoing can generally be repeated any suitable number of times or iterations until the predicted amount of time for the final phase does not exceed MAX to thereby result in commencing with the final phase of data migration. In at least one embodiment, one or more protection mechanisms can be utilized as stopping criteria in connection with stopping or terminating the data migration thereby indicating that the data migration cannot be completed without one or more further corrective actions. For example, in at least one embodiment, the stopping criteria can include any one or more of the following: a maximum number of iterations, replication cycles or snapshot differences that are allowed to be performed in connection with the first phase; and a maximum amount of time that can be elapsed performing the first phase. In at least one embodiment, if performing the first phase exceeds any one of the foregoing then processing can determine that it is not possible or expected for the final phase to be completed within the MAX time limit. Put another way, if performing the first phase exceeds any one of the foregoing, then it means that each evaluation in the first phase of the predicted or expected time for completing the final phase always exceeds MAX. For example, it may be that 300 snapshot differences or replication cycles are performed in the first phase over a time period of 24 hours resulting in an average data transfer time of 25 seconds to transfer V1 data changes of each replication cycle from DS1 to DS2. The predicted or expected time to complete the final phase can therefore always be expected to be 25 seconds or more, and MAX can be 10 seconds whereby the predicted time for competing the final phase can always exceed MAX. The foregoing elapsed time of 24 hours and elapsed 300 snapshot difference or replication cycles may have exceeded corresponding thresholds. In this case, if MAX is 10 seconds, processing can determine to terminate the data migration.

In response to terminating the data migration based on the foregoing in at least one embodiment, further action can be recommended and taken. In at least one embodiment, one or more actions recommended and performed can include any suitable action such as to make suitable configuration changes. For example, the one or more actions can include any of: reducing host write I/O bandwidth such as by throttling down host write I/O activity using any suitable technique, and/or increasing the replication bandwidth or replication link resources available for transferring V1 data changes from DS1 to DS2.

In at least one embodiment, the final phase can further utilize a time limit or threshold. Put another way in at least one embodiment, processing can also include monitoring or tracking the amount of elapsed time of the final phase to enforce the MAX time limit of the final phase. If the amount of elapsed time of performing the final phase exceeds MAX, then processing can be performed to interrupt or stop the final phase processing and revert back to performing the first phase. For example, assume MAX=10 seconds and the estimated time to complete the final phase is 5 seconds in connection with the data migration. The final phase of data migration can be commenced. During the final phase, there can be an unexpected network problem such as the replication link can go down or be otherwise unable to transfer the last set of V1 data changes. As a result, the elapsed time of the final phase can exceed 10 seconds. In at least one embodiment, processing can then return to the first phase processing to perform one or more additional iterations as noted above in efforts to achieve a predicted amount of time for completing the final phase not exceeding MAX.

In at least one embodiment, yet further stopping criteria can be utilized that further places a limit on the number of times that the final phase can be interrupted or stopped due to the actual elapsed time of the final phase exceeding a specified maximum time limit such as MAX. For example, it may be that the replication link intermittently fails in a continuous manner (e.g., the replication link can continually iterate between a working state capable of transferring data and a failure or down state incapable of transferring data). In this scenario, the final phase elapsed time can be continually exceeding MAX such that the final phase is interrupted or stopped multiple times resulting in resuming the first phase M1 multiple times. If M1 exceeds a specified maximum threshold, then the data migration processing can be terminated or stopped. Once the replication link failure has been corrected, the data migration can be performed (e.g., repeat the first phase and final phase.

In at least one embodiment, the final phase of data migration can generally perform processing to switch over host usage from V1 of DS1 to V2 of DS2. In at least one embodiment, the final phase of migration can include: i) quiescing any new host I/O received that are directed to V1; ii) draining or completing an in-progress, pending or incomplete host I/Os directed to V1; iii) taking a final snapshot snap F of V1 and using the snapshot difference technique to determine the final or last set of V1 data changes (e.g., of the last or final replication cycle F) based on the difference between snap F of V1 and snap F-1 of V1; and iv) replicating, copying or transferring, over the replication link, the V1 data changes of the final replication cycle F.

Additionally in at least one embodiment, the final phase can include performing processing to switch host or storage client usage from V1 of DS1 to V2 of DS2. In at least one embodiment, switching host or storage client usage from V1 of DS1 to V2 of DS2 can include modifying path states. For example, with reference to FIG. 4, the state of path 2108*a* can be modified, such as to unavailable by the DS1 2102, so that the host 2110*a* is no longer able to send I/Os to V1 2124. Additionally with reference to FIG. 6, the state of path 401*a* can be modified, such as by DS2 2104, so that the host 2110*a* is able to send I/Os to V2 2126. In at least one embodiment, V1 2124 and V2 2126 can be configured to have the same identity when presented to or viewed by the host 2110*a*. For example in at least one embodiment, V1 2124 and V1 2126 can be configured as the same logical device, volume, or LUN, such as LUN A. In this case after the migration switchover, the host 2110*a* can be configured to view V2 2126 as the same logical device or volume as V1 2124.

In at least one embodiment, quiescing new host I/Os in the final phase of migration can include queuing any new host I/Os received subsequent to a specified point in time T11 when the quiescing is in effect. In at least one embodiment, any pending, in-progress or incomplete I/Os whose servicing commenced prior to the quiescing at T11 can be allowed to drain or complete. The queued host I/Os can be handled in any suitable manner. In at least one embodiment, for each queued or quiesced host I/O, the storage system may not return any response. When no response or reply is received within an expected time period by the originating host for the quiesced host I/O, the host can retry the host I/O. In at least one embodiment, the host retry can be performed such as after the switchover from V1 to V2 is complete. In this manner, a quiesced host I/O previously sent over path 2108*a* (as in FIG. 4) by the host 2110*a* can be retried by having the host 2110*a* send the host I/O over path 401*a* to V2 2126 of DS2 2104 (e.g., as in FIG. 6). As a variation to the foregoing in at least one embodiment, for each quiesced host I/O sent over path 2108*a* (as in FIG. 4), DS1 can return an error, response or reply to the issuing host. In the final phase, the issuing host can also be notified in any suitable manner regarding the configuration changes, where the host can no longer send I/Os to V1 over path 2108*a* and the host can alternatively send I/Os to V2 over path 401*a*.

In at least one embodiment, after the initial synchronization of V1 and V2, a delta synchronization can refer to a single iteration in connection with a single replication cycle or snapshot difference. In connection with asynchronous replication performed in the first phase, after the initial synchronization in at least one embodiment, subsequent snapshots can be taken at a periodic fixed interval or time period, such as every 5 minutes where such snapshots are replication related snapshots used in connection performing the snapshot difference technique to determine V1 data changes or differences between two successive replication related snapshots.

Figure 7A:
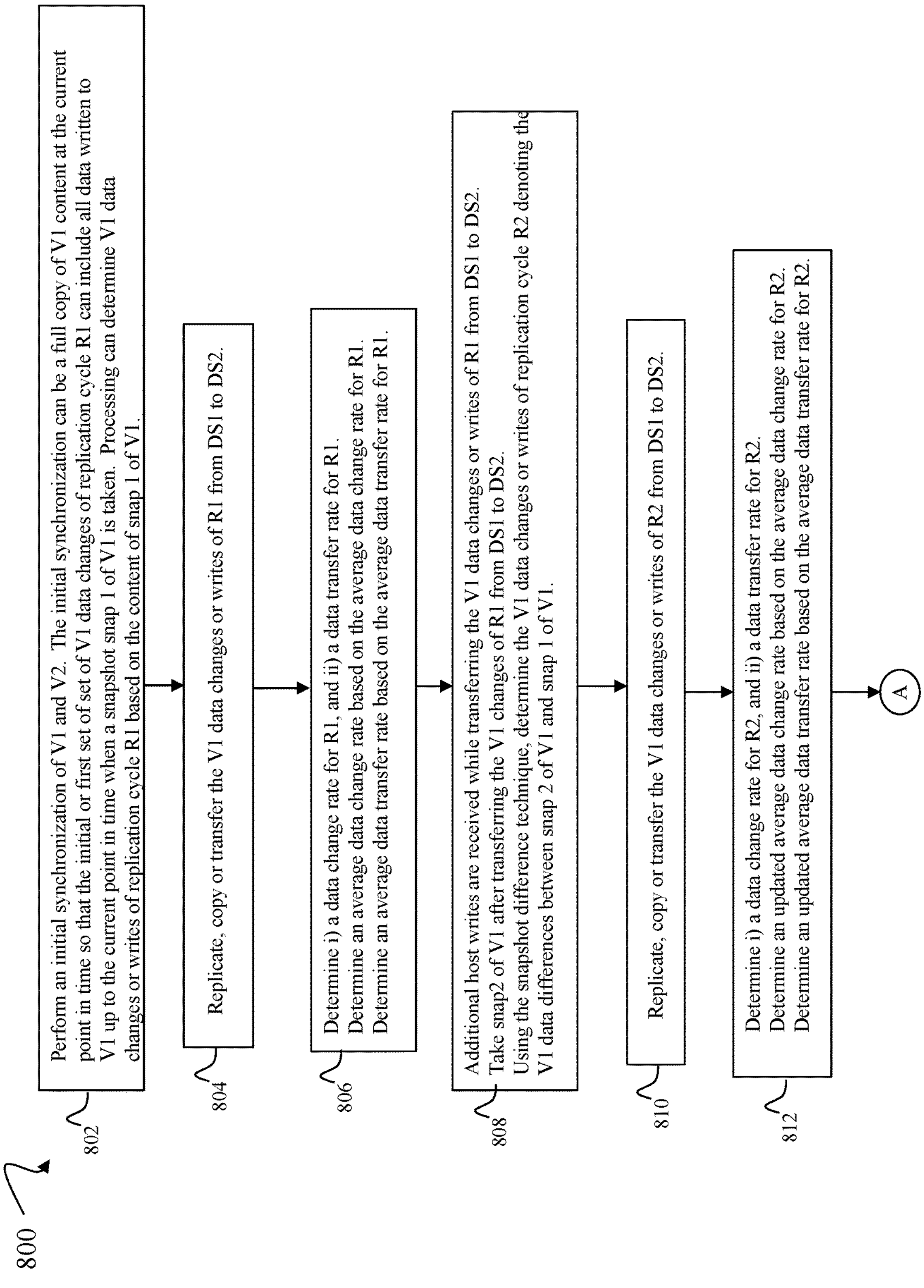
Figure 7B:
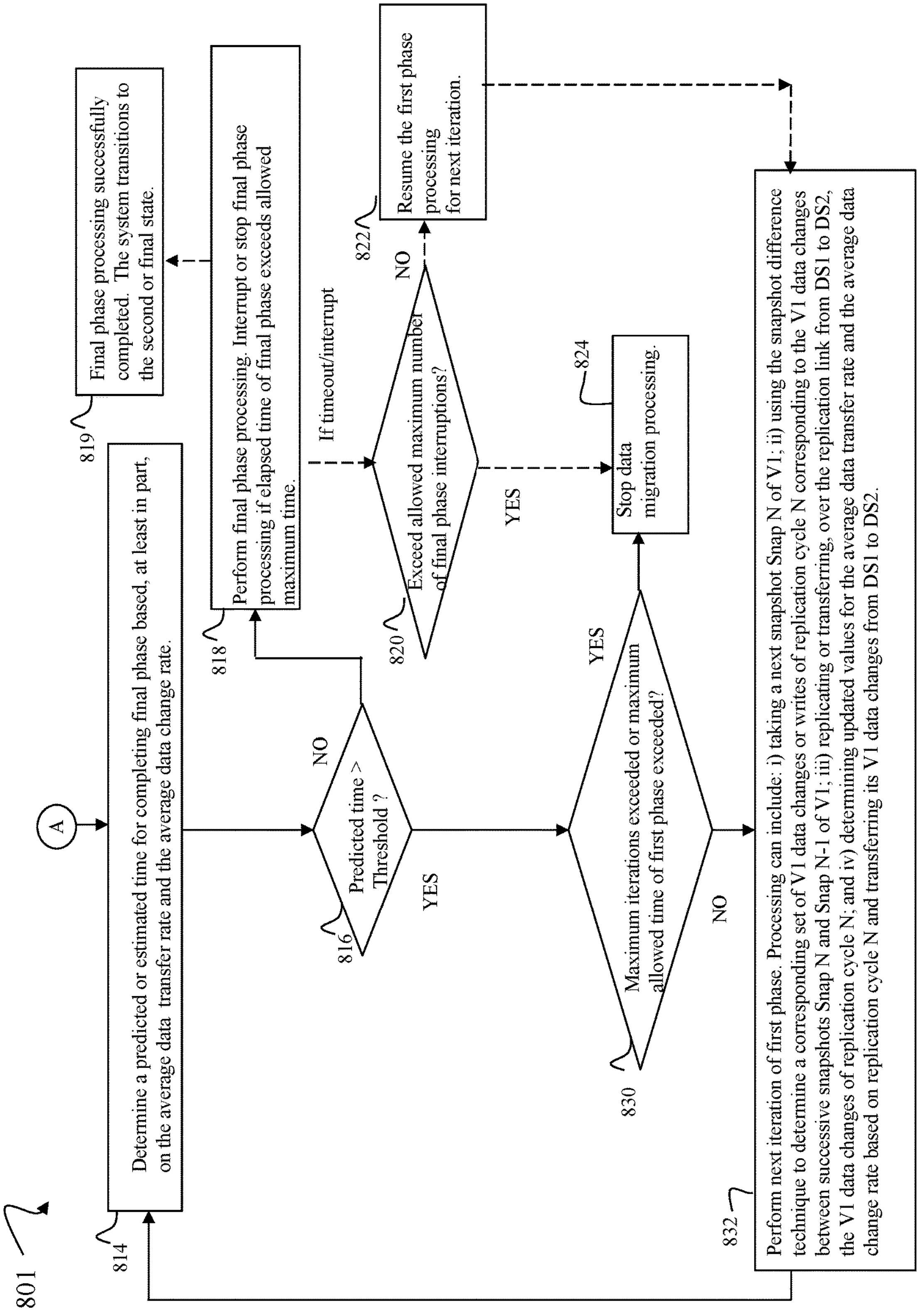

Referring to FIGS. 7A and 7B, shown is a flowchart 800, 801 of processing steps that can be performed in at least one embodiment in accordance with the techniques of the present disclosure. The steps of 800, 801 summarize processing described above for data migration processing.

The steps of FIGS. 7A and 7B can be performed with respect to a volume pair, V1 of DS1 and V2 of DS2 configured for asynchronous replication. Thus prior to step 802, processing can be performed to establish the asynchronous replication configuration or session for replicating V1 data changes or writes to V2.

At the step 802, processing can be performed for an initial synchronization of V1 and V2. The initial synchronization can be a full copy of V1 content at the current point in time so that the initial or first set of set of V1 data changes of replication cycle R1 can include all data written to V1 up to the current point in time when a snapshot snap 1 of V1 is taken. Processing can include taking a snapshot snap1 of V1, and determining V1 data changes or writes of replication cycle R1 based on the content of snap 1 of V1 (which will include all data written to V1). Consistent with subsequent steps and other discussion herein, subsequent replication cycles or sets of data changes can be based on the snapshot difference technique. From the step 802, control proceeds to the step 804.

At the step 804, replicate, copy or transfer the V1 data changes or writes of R1 from DS1 to DS2. The V1 data changes or writes of R1 can be included in snap1 of V1 that is replicated or copied in the step 804. From the step 804, control proceeds to the step 806.

At the step 806, determine i) a data change rate for R1, and ii) a data transfer rate for R1. The step 806 can also: determine an average data change rate based on the average data change rate for R1, and determine an average data transfer rate based on the average data transfer rate for R1.

In at least one embodiment, the data change rate for R1 may not be calculated or used in connection with determining the average data change rate. Put another way in at least one embodiment, although the data transfer rate for R1 (e.g., the initial synchronization) can be used in connection with determining the average data transfer rate, the data change rate for R1 (e.g., the initial synchronization) may be omitted since it corresponds to the initial synchronization of all writes to V1 over a time period from when V1 was created or first used for storing client data. From the step 806, control proceeds to the step 808.

At the step 808, additional host writes are received while transferring the V1 data changes or writes of R1 from DS1 to DS2. Processing can take a snapshot snap2 of V1 after transferring the V1 changes of R1 from DS1 to DS2. Using the snapshot difference technique, determine the V1 data changes or writes of replication cycle R2 denoting the V1 data differences between snap 2 of V1 and snap 1 of V1. In at least one embodiment, subsequent snapshots of V1 taken from snap 2 and in subsequent iterations of the snapshot difference technique can take snapshots of V1 periodically at a defined time interval, such as every 5 minutes. From the step 808, control proceeds to the step 810.

At the step 810, replicate, copy or transfer the V1 data changes or writes of R2 from DS1 to DS2. The V1 data changes or writes of R2 can be included in snap2 of V1 that is replicated or copied in the step 810. From the step 810, control proceeds to the step 812.

At the step 812, processing can determine i) a data change rate for R2, and ii) a data transfer rate for R2. In the step 812, processing can also: determine an updated average data change rate based on the average data change rate for R2; and determine an updated average data transfer rate based on the average data transfer rate for R2. From the step 812, control proceeds to the step 814.

At the step 814, processing can determine a predicted or estimated time for completing the final phase based, at least in part, on the average data transfer rate and the average data change rate. From the step 814, control proceeds to the step 816.

At the step 816, a determination is made as to whether the predicted time (determined in step 814) exceeds a maximum time threshold, MAX. If the step 816 evaluates to no, control proceeds to the step 818. At the step 818, final phase processing can be performed. At the step 818, the final phase processing can be interrupted or stopped if the elapsed time of the final phase exceeds an allowed maximum time for the final phase. Arrows are illustrated as dashed such as to steps 819, 820, 822 and 824 as such steps can be conditionally performed. For example, step 819 is performed if the final phase has completed and is successful. As another example, the steps 820, and 822 and/or 824 can be performed if the final phase times out or is interrupted in the step 818. If the final phase processing is interrupted, control proceeds from the step 818 to the step 820. At the step 820, it can be determined whether the maximum number of final phase interruptions has been exceeded. If the step 820 evaluates to yes whereby the final phase has been interrupted a number of times exceeding the allowed maximum number of final phase interruptions, control proceeds to step 824 where the data migration processing can stop. If the step 820 evaluates to no whereby the final phase has not been interrupted a number of times exceeding the allowed maximum, control proceeds to the step 822. At the step 822, the first phase processing can resume for the iteration whereby control proceeds from the step 822 to the step 832 discussed below. If the final phase processing of step 818 completes without interruption or other error, control proceeds to the step 819 where the system transitions to a second or final state. In at least one embodiment where the data processing application is data migration, the second state can denote the final state of the data migration where, for example, i) all V1 data has been migrated from DS1 to V2 of the DS2, and ii) external hosts can now issue I/Os to V2 of DS2 rather than V1 of DS1. In at least one embodiment in the second or final state of data migration, V1 of DS1 may no longer be visible and/or accessible to the external hosts for issuing I/Os.

If the step 816 evaluates to yes whereby the predicted time of the final phase exceeds the specified maximum threshold, MAX, control proceeds to step 830. At the step 830, a determination is made as to whether the maximum number of iterations of the first phase is exceeded or whether the elapsed first phase time exceeds a maximum allowed time of the first phase. If the step 830 evaluates to yes, control proceeds to the step 824 to stop the data migration processing. If the step 830 evaluates to no, control proceeds to the step 832 to perform processing for the next iteration of the first phase. Processing of the step 832 can include: i) taking a next snapshot Snap N of V1; ii) using the snapshot difference technique to determine a corresponding set of V1 data changes or writes of replication cycle N corresponding to the V1 data changes between successive snapshots Snap N and Snap N−1 of V1; iii) replicating or transferring, over the replication link from DS1 to DS2, the V1 data changes of replication cycle N (e.g., the snapshot snap N of V1 is replicated and includes the V1 data changes of replication cycle N); and iv) determining updated values for the average data transfer rate and the average data change rate based on replication cycle N and transferring its V1 data changes (e.g., transferring snap 2 of V1) from DS1 to DS2. From the step 832, control proceeds to the step 814 to determine a predicted or estimated time for completing the final phase based, at least in part, on the current values of the average data transfer rate and the average data change rate.

Consistent with other discussion herein, the step 818 can additionally or alternatively use an overall timer that tracks the overall amount of elapsed time in connection with performing the data processing application or use case such as data migration. The overall elapsed time can denote the cumulative amount of time that has elapsed thereby including the first phase processing and also the final phase processing. If the overall elapsed time exceeds a corresponding maximum in the step 818, then the final phase can be interrupted and control can also proceed to the step 820.

In at least one embodiment with reference to FIGS. 7A and 7B, the first phase can include all steps of FIG. 7A, and steps 814, 816, 830 and 832.

In at least one embodiment, the final processing phase can be characterized as including a deterministic sequence of processing steps that can be performed to determine whether to transition the asynchronous replication configuration from the first state to the second state within an amount of elapsed time that does not exceed a specified threshold.

The foregoing describes use of the techniques of the present disclosure in at least one embodiment with a use case or data processing application of data migration where the final phase includes processing for switching over from V1 to V2. With data migration, processing proceeds to the final phase when the expected or predicted time for completing the final phase is less than a specified threshold such as MAX. With data migration in at least one embodiment, processing can proceed to the final phase when the delta or amount of V1 changes converges and reduces to a sufficiently small size or amount such that the predicted amount of time to transfer or copy the last set of V1 data changes is less than a specified maximum transfer time.

In a similar manner, the techniques of the present disclosure can be used in connection with other suitable use cases or data processing applications besides data migration.

In at least one embodiment, the techniques of the present disclosure can be used with a data migration that is a variation of the above where V1 data or content can be from an external system DS1 that is imported to V2 of DS1. In this embodiment, the final processing can include enabling mirroring of all subsequent writes to V2 so that such V2 writes can be synchronously replicated to V1 of DS1. Put another way, after the final phase switches from V1 to V2 so that the external hosts use V2 rather than V1 (e.g., hosts can no longer write to V1 directly by sending writes to DS1), at least one embodiment can enable the foregoing mirroring to keep the V1 source content synchronized with V2 such as until the user decides to commit the migration. The foregoing mirroring can include transferring the V2 writes over the replication link from DS2 to DS1, whereby the V2 writes can be applied to V1.

In at least one embodiment, the techniques of the present disclosure can be used in connection with transitioning from asynchronous replication of V1 to V2 to synchronous replication of V1 to V2. In this use case, the processing as described above in connection with the first phase of processing can be performed. An amount of time to complete the final phase can be predicted or determined such as also discussed above where the predicted time must be less than a threshold time in order to commence the final phase. In this use case, the final phase can include processing to transition from asynchronous replication to synchronous replication from V1 to V2 where the configuration remains as in FIG. 4 with the difference that writes to V1 are replicated synchronously over link 2402 from DS1 2102 to DS2 2104, where the replicated writes can then be applied to V2 of DS 2104.

In at least one embodiment, the final phase to transition from asynchronous replication of V1 to V2 to synchronous replication from V1 to V2 can include performing a final asynchronous replication cycle RF corresponding to a final snapshot difference between a final snapshot snap F of V1 and snap F-1 of V1. The size or amount of V1 data changes in the final snapshot difference for RF can be expected to be less than a threshold size, where such V data changes of the final snapshot difference can be expected to transfer from DS1 to DS1 within a specified amount of time. The size or amount, X1, of data for RF predicted can be based, for example, on the average data change rate and the duration of time over which the final snapshot F of V1 is taken. The predicted amount of time for transferring the V1 data changes of RF from DS1 to DS2 can be based on the average data transfer rate such as by dividing X1 by the average data transfer rate. If the predicted amount of time for transferring V1 data changes of a current or most recent snapshot difference or replication cycle is less than a specified maximum, then the asynchronous replication mode for V1 and V2 can transition to the final phase where the replication mode can be changed to synchronous replication from V1 to V2.

In at least one embodiment, the techniques of the present disclosure can be used in connection with transitioning from a first asynchronous replication mode for asynchronous replication of V1 to V2 to a second asynchronous replication mode for asynchronous replication of V1 to V2. In this use case, the processing as described above in connection with the first phase of processing can be performed. An amount of time can be predicted or determined such as also discussed above where the predicted time must be less than a threshold time in order to commence the final phase. In this use case, the predicted time and corresponding maximum threshold can be related to the amount of time for transferring the V1 data changes of the next replication cycle Rn. In this use case, the final phase can include processing to transition from the first to the second asynchronous replication mode for V1 and V2 where, in the second asynchronous replication mode, the configuration can generally remain as in FIG. 4 with the difference that writes to V1 are replicated asynchronously using the second replication mode or technique over link 2402 from DS1 2102 to DS2 2104, where the replicated writes can then be applied to V2 of DS 2104.

In at least one embodiment, the first asynchronous replication mode can be the snapshot difference technique as discussed elsewhere herein. In at least one embodiment, the second asynchronous replication mode can be a low RPO asynchronous replication mode (sometimes referred to as the low RPO replication mode, low RPO mode or NZ mode). In at least one embodiment, the predicted or estimated amount of time Y1 can denote the expected amount of time for transferring the next set of V1 data changes for the next replication cycle Rn. In at least one embodiment, Y1 can be determined based on the average data change rate and the average data transfer rate. Assuming that the first asynchronous replication mode takes regular periodic snapshots for determining snapshots differences, the duration or amount of time E3 (e.g., such as 5 minutes) can be based on the frequency F1 with which such snapshots are taken (e.g., snapshots are taken every 5 minutes). The size or amount of V1 data changes of Rn can be determined, for example, by multiplying E3 by the average data change rate, where both of the foregoing are based on the same units of time. Y1 can then be determined, for example, by dividing the size or amount of V1 data changes of Rn by the average data transfer rate, where both of the foregoing are based on the same size units (e.g., MBs). With the low RPO replication mode in at least one embodiment, there is no need to quiesce host I/Os directed to V1. For example, it can be desirable that the Y1 be less than a threshold such as 15 or 20 seconds before transitioning to the low RPO replication mode. If Y1 is less than the foregoing corresponding threshold, processing can transition to the low RPO replication mode.

What will now be described are aspects of the low RPO replication mode in at least one embodiment in accordance with the techniques of the present disclosure. Generally the low RPO replication mode can perform one or more optimizations to speed up replication and thereby result in very low RPOs. The first asynchronous replication mode may not perform any such optimizations as performed by the low RPO replication mode.

The RPO for a typical asynchronous remote replication configuration or session, such as performed in connection with the first phase of processing discussed herein, can be defined as the maximum amount of allowable data loss, as measured by time, that can be lost after a recovery from a disaster, failure, or comparable event before data loss will exceed what is acceptable to an organization. Put another way, the RPO indicates how far behind in terms of time the remote or target storage object on the target system is allowed to be with respect to the source or primary copy of the storage object on the source system. Thus, with asynchronous replication configured for a source storage object and a remote or target storage object, the remote or target storage object and the source storage object can denote different point in time copies. The source storage object denotes the most up to date version of the storage object and the remote or target storage object denotes an earlier or prior version of the storage object than the source storage object. The RPO can be specified at a time granularity that can range typically, for example, from hours to a number of minutes.

In at least one embodiment, the first asynchronous replication mode can capture data changes or differences to be copied from the source storage object or volume, such as V1, to the target storage object or volume, such as V2, in repeated cycles using the snapshot difference technique. A snapshot of a storage object such as a volume or logical device can be defined as a point in time version of the storage object, where the snapshot captures the state of the storage object, such as with respect to the current content of the storage object, when the snapshot is taken. The snapshot difference technique can be utilized where the source system continually takes successive snapshots of the source storage object at a specified defined rate or frequency based on the defined RPO. The snapshots can sometimes be referred to as transient snapshots or replication related snapshots in that they are used only internally in the source system for asynchronous replication purposes. The source system can determine a difference in content between the current snapshot N of the source storage object and the immediately prior snapshot N−1 of the source storage object, where the data changes replicated to the target system correspond to the difference in content between the snapshots N and N−1 of the source storage object. Thus, the difference in content between each pair of successive snapshots can denote the set of data changes or writes that is replicated from the snapshot N of the source object to the target storage object of the target system. Generally, as the RPO gets smaller, the frequency or rate at which snapshots are taken and differences determined using the snapshot difference technique increases. In at least one version of the snapshot difference technique (sometimes referred to as the legacy version), resource intensive processing can be performed that includes creating the two successive snapshots N−1 and N, and then subsequently deleting the two snapshots in a very short time period solely for the purposes of replication. Thus, for very small RPOs that can be desired, taking replication related snapshots at a high rate or frequency and repeatedly using the snapshot difference technique to determine each set or cycle of data changes replicated can be inefficient and have an adverse effects including excessive overhead costs.

It can be desirable to support specifying an even smaller time granularity for an RPO such as less than a minute or a number of seconds. It can further be desirable to provide for efficient asynchronous replication resulting in a low RPO that is a number of seconds or generally less than a minute.

Accordingly, a more efficient asynchronous replication technique or mode sometimes referred to as the low RPO replication technique or NZ replication technique can be used in at least one embodiment in accordance with the techniques of the present disclosure. Additionally in at least one embodiment, the low RPO or NZ replication technique or mode can perform various optimizations that provide for efficient asynchronous replication of a configured volume pair including a corresponding source storage object or volume of a source system and a corresponding target storage object or volume of a target system.

In at least one embodiment in accordance with the techniques of the present disclosure, the low RPO replication technique can perform multiple optimizations as discussed herein. For example in at least one embodiment, the low RPO replication technique can perform an optimization that uses cache for tracking writes made to a configured volume between consecutive replication-related snapshots taken of the volume for determining the data difference to be copied or migrated from the source to the target.

In at least one embodiment, the low RPO replication technique or mode described herein provides for asynchronous replication that results in a near zero RPO or more generally a low RPO. For a configured replication session of a volume pair that perform asynchronous replication using the low RPO replication technique, multiple optimizations can be performed in connection with asynchronous replication that provide for achieving the very low RPO with the low RPO replication technique. One of the optimizations provides for tracking writes and keeping a record in cache of such writes made to a volume between successive snapshots. In at least one embodiment, the low RPO replication technique can also perform additional optimizations all of which can be dependent on the write tracking being performed where such the particular addresses or locations of the writes made to the volume between successive replication-related snapshots are tracked in cache.

In at least one embodiment, an asynchronous replication session operating using the low RPO replication technique can provide for efficient asynchronous replication for a volume pair that results in a very small RPO that is on the scale of a number of seconds or generally less than a minute (e.g., generally a "near zero" RPO due to the very small RPO). With near zero (NZ) or low RPO replication in at least one embodiment, snapshots can be taken in a continuous ongoing manner such that when the data changes of a current replication cycle have been replicated or copied from the source to the target system, the source system can take a next snapshot of the source storage object and then replicate the data changes of the next replication cycle to the target system. The foregoing can be performed in an ongoing manner in at least one embodiment. In at least one embodiment, rather than taking replication related snapshots at a frequency based on a defined RPO value or setting, the near zero or low RPO replication can perform asynchronous replication by continually taking snapshots of the source storage object in an ongoing manner and then replicating data changes of the latest replication cycle. A replication cycle can occur between two successive replication related snapshots of a source volume where the writes made to the source volume between the time period when the two successive snapshots are taken are included in the replication cycle. Thus with near zero or low RPO replication for a configured volume pair (V1, V2) where V1 is the source volume configured for asynchronous remote replication to the target volume V2, in at least one embodiment, once the current replication cycle of data changes to V1 is copied or replicated from the source system to the target system, the source system can immediately commence the next replication cycle without regard to taking snapshots at a defined frequency.

In at least one embodiment, a replication related snapshot can denote a snapshot taken for replication related purposes such as for asynchronous replication using the near zero or low RPO replication technique described herein. In at least one embodiment, replication related snapshots can be used internally by the source storage system to capture data changes that are copied or replicated in ongoing replication cycles to the target system for a configured volume pair (V1, V2) where V1 is the source volume configured for asynchronous remote replication to the target volume V2. In at least one embodiment, the low RPO replication technique can be used where records of such replication related snapshots are transient and are retained in the log without flushing, and thus without actually creating the corresponding snapshots and corresponding metadata.

In at least one embodiment, the low RPO or near zero replication can provide a low RPO by utilizing limited or finite resources of the storage system, where such resources can include cache resources and the log resources. In at least one embodiment as discussed elsewhere herein, writes and other operations can be recorded in the persisted log and also in a volatile memory cache. Once the write or other operation has been recorded in the persisted log, an acknowledgement regarding completion of the operation can be returned to the client that sent the operation.

In at least one embodiment of the present disclosure, a low RPO or near zero RPO replication technique can perform multiple optimizations including: write tracking where tracked write locations between successive replication related snapshots are stored in write tracking cache or memory; using transient snapshots or snaps that can be retained in the log without flushing until deleted from the log; and holding or maintaining data to be replicated in a cache of the source system until the data has been asynchronously replicated to the target system.

In at least one embodiment, the low RPO replication technique of the present disclosure can determine data changes or writes that are replicated in a replication cycle without performing the expensive snapshot difference technique such as noted above where the snapshots are actually flushed from the log and created such as by a mapper component discussed elsewhere herein. In at least one embodiment using the low RPO replication technique, a cache or caching layer can perform write tracking of tagged writes where the cache can identify all writes tagged with a particular tracking identifier (ID). The particular tracking ID can uniquely identify tracked writes of a particular replication cycle between two successive snapshots of a source volume.

All writes tracked with the particular tracking ID can denote the data changes in the replication cycle for a particular source volume. Thus in at least one embodiment, the above-noted write tracking can be used with the low RPO replication technique to determine corresponding locations in the source volume of the data changes to be replicated to the target system, where such tracked write locations are stored in the write tracking cache or memory. Thus such tracked data changes of the source storage object on the source system can denote source volume locations or offsets of written or changed data that is replicated from the source to the remote target system in a single replication cycle and then applied to the corresponding target storage object.

In at least one embodiment, the low RPO replication techniques of the present disclosure can include retaining the changed or written data (to be replicated in connection with asynchronous replication for a source volume) in the cache of the source system until the changed or written data has been replicated from the source to the target system. In at least one embodiment, the changed or written data can remain in the source system's cache until the source system receives an acknowledgement from the target system that the changed data has been successfully received and committed.

In at least one embodiment, the low RPO replication techniques of the present disclosure can utilize a mechanism for write tracking of write I/Os in the data path where a cache or caching layer, such as a transactional caching layer, can track tagged write I/Os (e.g., tagged with a tracking ID). In at least one embodiment with the low RPO replication technique or mode, the cache or caching layer of the source storage system can track metadata or information about the tagged write I/Os directed to a corresponding source storage object or volume, where the information can include a volume, offset (e.g., logical block address or LBA), and length corresponding to each tracked write I/O. The volume, offset and length can correspond to a target address or location of the write I/O to which data or content is written by the write I/O. At a later point in time in at least one embodiment, the information or metadata regarding tracked writes having a particular tracking ID can be requested and collected. The collected information or metadata for the particular tracking ID can describe, for example, the offsets or locations corresponding to the data changes or writes included in a particular replication cycle for the source storage object or volume. In at least one embodiment, the collected information regarding tracked writes can be stored in the write tracking cache or memory.

In at least one embodiment of the low RPO replication technique or mode, the data changes or differences between two successive replication related snapshots N−1 and N of the source object can be identified by the tracked writes having a particular tracking ID. In at least one embodiment, data changes corresponding to successive snapshots of the source object can be identified by tracked writes directed to the source object, where such tracked writes can be tagged with corresponding tracking IDs uniquely associated with corresponding replication cycles.

In at least one embodiment for a replication session configured for low RPO replication that is one way asynchronous replication for a volume pair V1, V2, where V1 is the source volume on the source system and V2 is the target volume on the target system, the caching layer on the source system (e.g., DS1) can track tagged write I/Os directed to the source volume V1 on the source system in connection with replication related snapshots for near zero or low RPO replication. In at least one embodiment of the low RPO technique, the tracked writes can denote a list of changed offsets or locations of V1 modified between successively taken replication-related snapshots of V1. The tracked writes can be stored as a list in a portion of a volatile memory cache of the source system. Low RPO replication techniques can then use the list of tracked writes as stored in cache (e.g., the write tracking cache) to identify the content to be replicated from the source system to the target system without having to use a more resource intensive technique. Additionally in at least one embodiment, retaining the content or data of the tracked writes in cache until such content or data has been replicated allows the low RPO replication technique to efficiently retrieve the content or data to be replicated from cache, as opposed to the more costly and time consuming processing of reading the data or content to be replicated from backend (BE) non-volatile storage.

Thus in at least one embodiment, the low RPO technique can store the list of tracked writes in cache where the list identifies logical addresses of the content to be replicated. In at least one embodiment, the low RPO technique can traverse the list of tracked writes to identify logical addresses or locations of V1 to be replicated, where the content or data of such logical addresses or locations can also be retrieved efficiently from cache without incurring the expensive processing of a read cache miss.

In at least one embodiment in accordance with the techniques of the present disclosure, the low RPO techniques can further utilize transient snapshots that are successively and continuously taken replication related snapshots. In low RPO replication, replication related snapshots can be created and deleted in a relatively short amount of time. In at least one embodiment, a snapshot request corresponding to a request to create a replication related snapshot of the source volume V1 can be received at the source system. In at least one embodiment, a log on the source system can be used to record, in time order, write I/Os of V1 and other operations such as commands to create and delete snapshots including replication related snapshots of V1. In such an embodiment, a record denoting the replication related snapshot creation or request can be recorded in the log having a relative position or location with respect to recorded writes that are included in the particular snapshot. Thus the log can include records in a time ordered sequence denoting the order in which recorded operations are received and applied.

In at least one embodiment, the low RPO replication technique can provide for retaining in the log replication related snapshot commands that create transient snapshots without flushing them from the log until deleted from the log. In at least one embodiment, transient snapshots can be created and deleted by a replication service that performs the low RPO replication technique. In this manner, the replication service can create a transient snapshot and then delete the transient snapshot when the service is done using the transient snapshot for its replication purposes. In at least one embodiment, the record of the log denoting the request to create or take the replication related snapshot can be marked as transient indicating that the particular snapshot created is a replication related or transient snapshot. In at least one embodiment of the low RPO replication technique, a transient flag or indicator of a log record for a create snapshot command can indicate that the log records corresponding to the snapshot and the snapshot's (dirty) write data be retained in the log and not flushed from the log until the snapshot has been deleted, as denoted by an entry recorded in the log for the delete snapshot operation. In at least one embodiment, once the low RPO technique has replicated content or write data of write I/Os received between successive transient snapshots N−1 and N from the source system to the target system, the log record of the transient snapshot N−1 can be deleted and the log records of write I/Os between transient snapshots N−1 and N can be flushed from the log. In at least one embodiment of the low RPO replication technique, the foregoing of retaining records for the transient snapshot in the log until deleted can be performed, for example, rather than incur additional performance penalties associated with flushing records of the transient snapshot creation and subsequent write I/Os from the log, and then performing processing to delete the transient snapshot after it has been flushed from the log and created.

In at least one embodiment, flushing records of the transient snapshot from the log can be an expensive operation and can include creating and storing corresponding metadata for the transient snapshot. Furthermore, subsequent flushed writes to the source volume occurring after taking the transient snapshot of the source volume can also result in write splits causing additional metadata updates. In at least one embodiment, deleting the flushed transient snapshot can be an expensive operation in that the corresponding metadata for the snapshot is deleted and/or updated. Furthermore, processing can also be performed to undo any previously performed operations in connection with the write splits. In at least one embodiment, a write split can be performed with respect to a metadata page and includes allocating a new metadata page where the content of an existing metadata page is copied to the new metadata page. In connection with taking a snapshot of a source volume, the source volume and the snapshot include the same content initially and can thus share one or more same metadata pages. Subsequently, writes can be applied to the source volume resulting in differences in stored content of the source volume and snapshot. As a result of the writes, a write split can be performed where, prior to the writes, the snapshot and the source volume may share the same metadata page. Subsequent to applying the writes such as to the source volume, a first metadata page that is shared by both the snapshot and the source volume may be modified to reflect the writes applied to the source volume. However, prior to modifying the existing first metadata page for use with the source volume writes, a write split operation can be performed to preserve or duplicate the existing first metadata page content in a new page for use with the snapshot. Thus in at least one embodiment in connection with the low RPO replication technique, retaining a transient snapshot in the log (e.g., retaining in the log a record to create a transient snapshot) until deleted can avoid expensive processing, such as write splits noted above, that can be associated with a flushed transient snapshot.

In at least one embodiment, dirty write data can generally be retained in cache until the BE non-volatile storage has been updated to persistently store the write data, whereby the write data can now be characterized as clean and can be a candidate for eviction from the cache. As may be needed in at least one embodiment, records of the transient snapshot can be flushed from the log such as, for example, if there is an insufficient amount of log space and/or cache. However in at least one embodiment using the low RPO replication technique, even though write data of the transient snapshot may be flushed from the log, write data can be retained in, and not evicted from, the cache even after being flushed from the log and characterized as clean.

In at least one embodiment, log records, such as records of transient snapshots and writes recorded in the persistent log, can also be stored in a volatile memory cache. While recorded writes of the log remain in the log, the write data can remain in the cache as dirty data that has not yet been flushed. Such dirty write data can be retained in the cache and may not be a candidate for removal or eviction. In at least one embodiment as part of normal processing in the data path, once the corresponding log records of the write data have been flushed from the log, the write data of the cache can be marked as clean, where clean data of the cache can be a candidate for removal or eviction. In at least one embodiment of low RPO replication, even if write data is flushed from the log, the write data can be retained in the cache of the source system until replicated to the target system.

In at least one embodiment, low RPO replication with respect to a volume pair (V1, V2) can denote one way asynchronous replication from a source volume V1 of a source system to a corresponding target volume V2 of a target system. In at least one embodiment, low RPO replication for the volume pair can replicate source volume data changes to the target system continuously such that as soon as one replication cycle ends, the next replication cycle begins. With low RPO replication in at least one embodiment, the cache can track tagged writes that are tagged with a tracking ID, and can store the list of tagged writes in cache. In at least one embodiment, tracking writes can include recording in cache information about the tagged writes such as volume, offset and length corresponding to the writes. In at least one embodiment, the tracking ID can be uniquely associated with a particular replication cycle of a particular source volume configured for near zero or low RPO replication. In this manner, querying the cache for tracked writes tagged with a particular tracking ID can denote the list of writes or data changes included in a particular corresponding replication cycle for a particular source volume. In at least one embodiment, low RPO replication can further include: retaining transient snapshots in the log; and retaining content to be replicated in the cache of the source system until such content has been replicated.

In at least one embodiment of low RPO replication, the following optimizations can be performed in connection with asynchronous replication for a configured volume pair (V1, V2): write tracking can be performed where the list of changes or writes to V1 to be replicated for a particular snapshot can be stored in cache; transient snapshots can be held in the log without flushing until deleted; and content to be replicated can remain in the cache until replicated. Thus for the low RPO replication in at least one embodiment, all content or data to be replicated can be dirty and can remain in cache on the source system until replicated to the target system.

In at least one embodiment, processing can be performed to transition the replication session and corresponding volume pair to the low RPO replication mode. In at least one embodiment with respect to a replication session for a volume pair (source volume V1, target volume V2), the first phase can be as discussed above and ca include: i) performing an initial synchronization between the source and target volumes, V1 and V2, of the volume pair, where the initial synchronization can be performed using a data storage system internal snapshot taken at the start or create time of the replication session; ii) performing snapshot based delta synchronizations until the volume data differences with respect to the source volume are below a specified threshold level (e.g., such that the source volume and respective target volume have minimal data differences below the threshold level); and iii) once the predicted amount of transfer time to transfer the foregoing data differences is below a specified threshold time, then the replication session can transition or switch to the low RPO replication mode where, for example, further copy operations (copying written or changed content from the source to the target) can be performed using the cache based change tracking optimization as well as other optimizations of the low RPO replication mode. Thus with the low RPO mode, asynchronous replication using continuous snapshot differences can be performed as noted above without waiting for a periodic time interval to occur. Additionally, the V1 data changes of the replication cycles or delta synchronizations of V1 and V2 can be performed using the optimizations of the low RPO mode.

In at least one embodiment, flushing a recorded command or operation to take a snapshot can also include allocating and/or updating metadata pages for the new snapshot. In at least one embodiment, write I/Os to a source volume can result in write splits with respect to metadata pages shared with a snapshot of the source volume, where a write split can result in allocating one or more new metadata pages to accommodate the snapshot and writes to the source volume. As a result, deleting the snapshot once it has been flushed from the log can include the expensive process of deleting and/or updating metadata pages corresponding to the snapshot and its writes. Thus in at least one embodiment using the low RPO replication technique, retaining a transient snapshot in the log until deleted can use additional cache and log resources for an extended period of time while also avoiding or omitting performing the expensive processing associated with deleting a snapshot after it has been actually created as a result of flushing the log entry of the create snapshot command from the log.

With reference back to FIG. 5A, the log component 254 can be configured to: record operations, commands or requests in the log 256, 258*a*; enforce constraints and dependencies between various operations that can be recorded in the log; and control flushing of the log 256, 258*a* to the mapper component 260. In accordance with the techniques of the present disclosure with the low RPO technique, the log component 254 can be configured to delay flushing recorded commands or operations, such as a command or operation to take or create transient snapshots, based on an indicator, such as a transient flag (TF) setting of the command to take a transient snapshot of a source volume.

In at least one embodiment, ingest processing of a write I/O and a snapshot related command (e.g., to create a snapshot of a volume or storage object and/or delete an existing snapshot of a volume or storage object) can include recording (e.g., committing) the command or operation in the log. Once the foregoing is recorded in the log, an acknowledgement can be returned to the client or originator of the command or operation just recorded in the log.

In at least one embodiment, the RRF 252 can be the client originating i) the command to create a transient or replication related snapshot and ii) the command to delete an existing transient or replication related snapshot. In at least one embodiment, write I/Os directed to a source volume configured for asynchronous replication using the low RPO techniques can be received at the storage system from a host or other external storage client. Subsequently, recorded operations or commands of the log can be flushed such as by the logger or log component 254. In at least one embodiment, flushing a recorded write I/O that writes content C1 to a first logical address LA1 can include: persistently storing C1 at a physical address or location PA1 on BE non-volatile storage 262; and creating and/or updating corresponding mapping information mapping LA1 to PA1.

Figure 8:
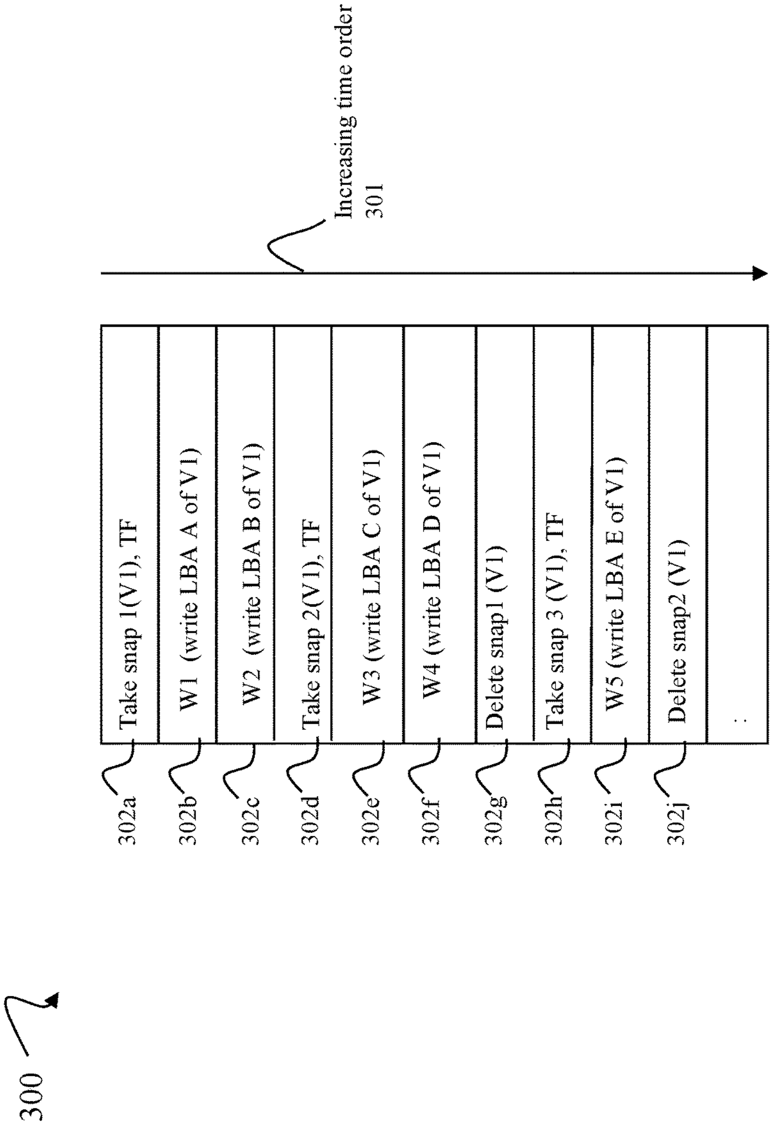
FIGS. 8 and 9 are examples illustrating processing performed with a low RPO (recovery point objective) asynchronous replication mode in at least one embodiment in accordance with the techniques of the present disclosure.

Referring to FIG. 8, shown is an example 300 illustrating use of the log in connection with recording transient or replication related snapshot operations and writes in at least one embodiment in accordance with performing low RPO asynchronous replication.

In the example 300, operations can be recorded as entries in the log in increasing time order as indicated by the arrow 301. Thus the records 302*a-j* denote operations, requests or commands recorded and committed to the log at various points in time in increasing time order.

Initially, a request or command to take or create a first transient or replication related snapshot, snap1, of the source volume V1, can be made by the RRF performing the low RPO replication techniques. The request to take snap1 of V1 is recorded in the log as record 302*a*, the transient flag (TF) is set for snap1 to signal to delay flushing the record 302*a*. In at least one embodiment, a log entry creating a snapshot can be viewed as a barrier record such that writes subsequent to the log entry for the create snapshot command are not flushed until the log entry for the create snapshot command is first flushed. Thus based on normal ordering of records of the log in at least one embodiment, the logger prevents write records, that occur in the log after a second record taking a snapshot, from being flushed prior to flushing the second record taking/creating the snapshot.

After recording 302*a* in the log, the storage system can receive writes W1 and W2 that are respectively recorded as entries 302*b-c* in the log. W1 and W2 can be writes directed respectively to LBAs A and B of V1.

In at least one embodiment, the write records 302*b-c* would normally induce write splits in the mapper 260 if the record 302*a* taking snap1 were allowed to be flushed before the records W1 and W2. In at least one embodiment in accordance with the low RPO replication technique, this can be avoided by delaying flushing of record 302*a* based on the transient flag TF.

Subsequent to recording the entries 302*b-c* in the log, RRF can issue a command or request to take a second transient or replication related snapshot, snap2, of the source volume V1. The request to take snap2 of V1 is recorded in the log as record 302*d*, where snap2 can have the transient flag (TF) set to signal to delay flushing the record 302*d*.

After recording 302*d* in the log, the storage system can receive writes W3 and W4 that are respectively recorded as entries 302*e-f* in the log. W3 and W4 can be writes directed respectively to LBAs C and D of V1. In at least one embodiment, the write records 302*e-f* would normally induce write splits in the mapper 260 if the record 302*d* taking snap2 were allowed to be flushed before the records W3 and W4. In at least one embodiment, this can be avoided by delaying flushing of record 302*d* based on the transient flag TF.

After recording entries 302*e-f* in the log, the RRF can issue a command or request to delete the transient or replication related snapshot, snap1 of V1. Snap1 of V1 is the snapshot instance taken by the recorded command of the record 302*a*. The command to delete snap1 of V1 can be recorded in entry 302*g* of the log. At some later point in time, the logger can associate delete snap1 record 302*g* with the create snap1 record 302*a*, and invalidate the create snap1 record 302*a*. As such in at least one embodiment using the low RPO replication technique, the logger can be viewed as cancelling the creation or taking of snap1 of V1 such that mapper does not perform any processing related to creating or deleting the snap1 of V1. The result of such invalidation by logger is to allow the write records W1 302*b* and W2 302*c* without inducing write splits in the mapper 260. Rather, the writes W1 302*b* and W2 302*c* can be flushed and proceed as ordinary writes.

After recording the record 302*g* in the log, the RRF can issue a command or request to take a third transient or replication related snapshot, snap3, of the source volume V1. The request to take snap3 of V1 is recorded in the log as record 302*h*, where the transient flag (TF) is set for snap3 to signal to delay flushing the record 302*h*.

After recording 302*h* in the log, the storage system can receive write W5 recorded as entry 302*i* in the log. W5 can write to LBA E of V1. In at least one embodiment, the write record 302*i* would normally induce write splits in the mapper 260 if the record 302*h* taking snap3 were allowed to be flushed before the record W5 302*i*. In at least one embodiment of the low RPO replication technique, this can be avoided by delaying flushing of record 302*h* based on the transient flag TF.

After recording 302*i* in the log, the RRF can issue a command or request to delete the transient or replication related snapshot, snap2 of V1. Snap2 of V1 is the snapshot instance taken by the recorded command of the record 302*d*. The command to delete snap2 of V1 can be recorded in entry 302*j* of the log. At some later point in time, the logger can associate delete snap2 record 302*j* with the create snap2 record 302*d*, and invalidate the create snap2 record 302*d*. The result of such invalidation by logger would be to allow the write records W3 302*e* and W4 302*f* without inducing write splits in the mapper 260. Rather, the writes W3 302*e* and W4 302*f* can be flushed and proceed as ordinary writes.

As can be seen from FIG. 8 in at least one embodiment of the low RPO replication technique, sequences including creating and deleting multiple transient snapshots can be managed by invalidation by logger and delaying flushing of transient snapshots marked using the TF flag, which can avoid: creating any mappings (e.g., of metadata pages) for the snapshots, deleting the mappings for the snapshots, performing write splits when there is block sharing with the snapshots, and performing any needed cleanup after the write splits (e.g., deleting unneeded metadata supporting the write splits).

Figure 9:
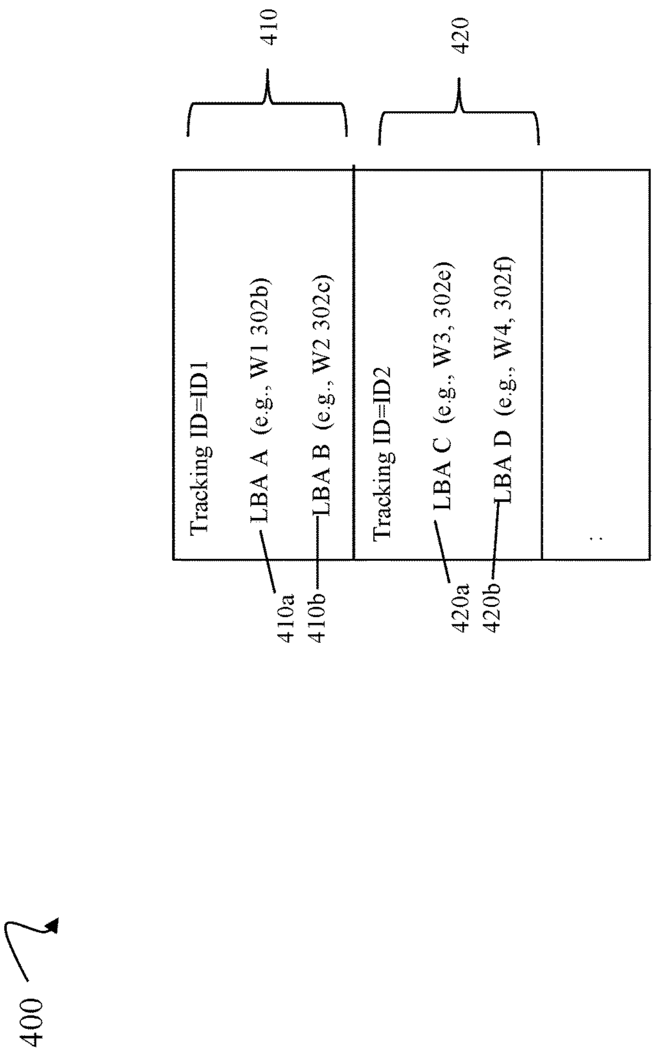

It should be noted that the example of FIG. 8 depicts an ordering in which the deletion of snap1 (302*g*) is placed before the creating of snap 3 (302*h*) thereby leaving snap2 as the only existing snapshot. In this example, the order or placement of delete snapshot commands and create snapshots commands is controlled by the RRF. In some embodiments, the RRF can have at least two transient snapshots at any given time. In this case, RRF can alternatively ensure a corresponding command sequence, for example, such that creating snap3 would alternatively occur prior to deleting snap1. In such an embodiment, there can be one replication cycle between two successive transient snapshots for which content is being replicated, and there can be another replication cycle that is open for which writes or data change are being tracked or collected. Referring to FIG. 9, shown is an example 400 of information that can be obtained as a result of write tracking in at least one embodiment of the low RPO replication technique in accordance with the techniques of the present disclosure.

In at least one embodiment, the cache or caching layer can perform write tracking of tagged writes where the cache can identify all writes tagged with a particular tracking identifier (ID). The particular tracking ID can uniquely identify a particular replication cycle between two successive snapshots of a source volume, and all writes tracked with the particular tracking ID can denote the data changes in the replication cycle. Put another way, writes can be tracked in a particular tracking session denoted by the tracking ID where the tracking session tracks writes made between two successive transient snapshots N−1 and N. Additionally generally the writes tracked for the tracking session with the tracking ID denote the writes included in the snapshot N. Based on the foregoing in at least one embodiment, the tracking ID can be uniquely associated with i) a particular source volume of an asynchronously configured volume pair, and ii) a particular snapshot of the particular source volume, where the tracking ID identifies content of the particular snapshot.

The information of 400 can be stored in the cache, such as a volatile memory cache. The information of 400 can include a list of changes to the source volume V1 between successive transient or replication related snapshots taken by RRF. In at least one embodiment, each tracking ID can uniquely identify a corresponding replication cycle between two successive transient snaps. The example 400 includes tracked writes for 2 replication cycles, where each replication cycle can denote data changes or writes made to V1 between two successive transient snapshots N−1 and N, and where such writes or data changes are included in the snapshot N.

In some instances, the cache or memory 400 used for write tracking can be referred to as write tracking memory or cache used in connection with tracking changed locations of volumes between successive snapshots of each such volume for use with the low RPO replication technique.

FIG. 8 illustrates a sequence of commands or operations recorded in the log including 3 commands or requests to take snapshots of V1. With reference back to FIG. 8, let a tracking ID=ID1 denote the data changes or writes included in a first replication cycle or tracking session between snap1 of V1 and snap2 of V1; and let a tracking ID=ID2 denote the data changes or writes included in a second replication cycle or tracking session between snap2 of V1 and snap3 of V1. Based on the foregoing in this example, writes or data changes tracked with tracking ID=ID1 can be those writes made to V1 during the time interval between taking snap1 of V1 and snap 2 of V1. Additionally, writes or data changes tracked with tracking ID=ID2 can be those writes made to V1 during the time interval between taking snap2 of V1 and snap 3 of V1.

The example 400 of FIG. 9 includes element 410 denoting tracked writes tagged with tracking ID=ID1 identifying those writes or data changes made to V1 in the first replication cycle or tracking session between snap1 and snap2 of V1. The element 410 includes: LBA A 410*a* corresponding to the write W1 302*b*, and LBA B 410*b* corresponding to the write W2 302*c*, where such writes W1 and W2 occur between taking snap 1 (302*a*) and snap2 (302*d*), and where such writes W1 and W2 can be tagged with the tracking ID=ID1.

The example 400 includes element 420 denoting tracked writes tagged with tracking ID=ID2 identifying those writes or data changes made to V1 in the second replication cycle or tracking session between snap2 and snap3 of V1. The element 420 includes: LBA C 420*a* corresponding to the write W3 302*e*; and LBA D 410*b* corresponding to the write W4 302*f*, where such writes W3 and W4 occur between taking snap2 (302*d*) and snap 3 (302*h*), where such writes W3 and W4 can be tagged with the tracking ID=ID2.

For a replication cycle or tracking session having a corresponding tracking ID with the low RPO replication technique, RRF can determine the list of locations of data changes or writes having associated content to be replicated in the replication cycle or tracking session by querying the cache for all tracked writes having the corresponding tracking ID. For example, RRF can perform processing to determine the list or set of locations of data changes in the first replication session by querying the cache for all tracked writes having the tracking ID of ID1. In response, the cache can return to RRF a list of LBAs or offsets, and associated lengths, of tracked writes of V1 having the tracking ID of ID1. In this example, the cache can determine that the LBA A 410*a* and LBA B 410*b* of V1 have been written to or modified during the first replication cycle or tracking session between snap1 and snap2.

Thus the RRF can determine a first set of data changes to be replicated from the source system to the target system by querying the cache for locations of V1 of tracked writes having the tracking ID=ID1, and then obtaining the data written to such locations, such as LBA A and LBA B of V1, during the corresponding replication cycle. In response to the query for tracked writes associated with tracking ID=ID1, the cache can return to RRF a list of LBA A and LBA B. In at least one embodiment, the content or data written by W1 to LBA A and by W2 to LBA B during the corresponding replication cycle can be retained in the cache until replicated. Thus, RRF can read, from the cache, the write data of LBA A (W1) and LBA B (W2) to be replicated. Once the write data of LBA A and LBA B has been replicated, write data of LBA A and LBA B, as stored in the cache, can be candidates for eviction or removal from the cache. The first set of data changes or differences denotes the locations of V1 that have been modified or written during the corresponding replication cycle between snaps 1 and 2 of V1.

RRF can perform processing to determine the list or set of locations of data changes in the second replication session by querying the cache for all tracked writes having the tracking ID of ID2. In response, the cache can return to RRF a list of LBAs or offsets, and associated lengths, of tracked writes of V1 having the tracking ID of ID2. In this example, the cache can determine that the LBA C 420*a* and LBA D 420*b* of V1 have been written to or modified during the second replication cycle or tracking session between snap2 and snap3 of V1.

Thus the RRF can determine a second set of data changes to be replicated from the source system to the target system by querying the cache for locations of V1 of tracked writes having the tracking ID=ID2, and then obtaining the data written to such locations, such as LBA C and LBA D of V1 during the corresponding replication cycle. In response to the query for tracked writes associated with tracking ID=ID2, the cache can return to RRF a list of LBA C and LBA D of V1. In at least one embodiment, the content or data written by W3 to LBA C and by W4 to LBA D during the corresponding replication cycle can be retained in the cache until replicated. Thus, RRF can read, from the cache, the write data of LBA C (W3) and LBA D (W4) of V1 to be replicated. Once the write data of LBA C and LBA D of V1 has been replicated, write data of LBA C and LBA D, as stored in the cache, can be candidates for eviction or removal from the cache. The second set of data changes or differences denotes the locations of V1 that have been modified or written to during the corresponding second replication cycle between snaps 2 and 3 of V1.

Thus in at least one embodiment, low RPO replication processing can include efficiently determining the set or list of changed locations of V1 for a particular replication cycle by querying the cache for the list. Additionally, low RPO replication processing can include efficiently obtaining the content of such changed locations by then reading the content of such changed locations from cache where such content can be retained and can remain in the cache until replicated.

Thus generally in at least one embodiment, asynchronous replication as performed using the low RPO replication techniques described herein can utilize multiple optimization to achieve very low RPOs, such as RPOs that are less than 30 seconds. Such multiple optimizations in at least one embodiment as described herein can include: write tracking; retaining records of the transient snapshots are recorded in the log until deleted; and retaining data to be replicated in cache until replicated.

Figure 10B:
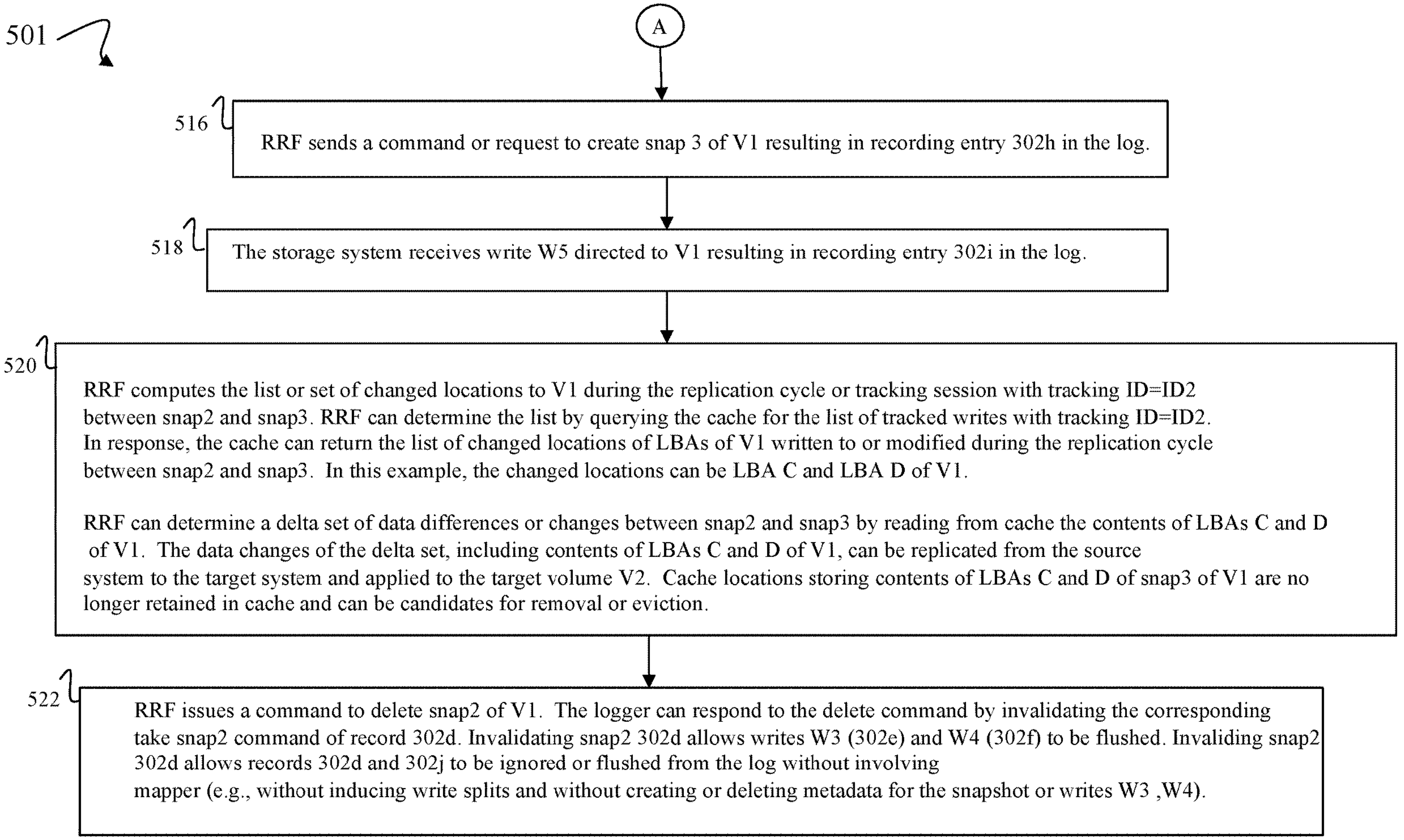

Referring to FIGS. 10A and 10B, shown is a flowchart 500, 501 of processing steps that can be performed in at least one embodiment of the low RPO replication technique. The steps of FIGS. 10A and 10B describe a sequence of processing steps that can be performed based on the example of FIGS. 8 and 9.

In the step 502, a volume pair can be configured for asynchronous replication. The volume pair can be V1 and V2, where V1 is a source volume on a source storage system and where V2 is a target volume on a target storage system. The asynchronous replication can be performed by the RRF of the source system, where RRF can perform low RPO replication. From the step 502, control proceeds to the step 504.

At the step 504, RRF sends a command or request to create snap 1 of V1 resulting in recording entry 302*a* in the log. From the step 504, control proceeds to the step 506.

At the step 506, the storage system receives writes W1 and W2 directed to V1 resulting in recording entries 302*b-c* in the log. From the step 506, control proceeds to the step 508.

At the step 508, RRF sends a command or request to create snap2 of V2 resulting in recording entry 302*d* in the log. From the step 508, control proceeds to the step 510.

At the step 510, the storage system receives writes W3 and W4 directed to V1 resulting in recording entries 302*e-f* in the log. From the step 510, control proceeds to the step 512.

At the step 512, RRF computes the list or set of changed locations to V1 during the replication cycle or tracking session with tracking ID=ID1 thereby denoting the replication cycle between snap1 of V1 and snap2 of V1. RRF can determine the list by querying the cache for the list of tracked writes with tracking ID=ID1. In response, the cache can return the list of changed locations or LBAs of V1 written to or modified during the replication cycle between snap1 and snap2 where such tracked writes are tagged with tracking ID=ID1. In this example, the changed locations can be LBA A and LBA B of V1. RRF can determine a delta set of data differences or changes between snap1 and snap2 by reading from cache the contents of LBAs A and B of V1 as written during the corresponding replication cycle. The data changes of the delta set, including contents of LBAs A and B of V1 as written during the corresponding replication cycle, can be replicated from the source system to the target system and applied to the target volume V2. At this point, cache locations storing contents of LBAs A and B of V1 are no longer retained in cache and can be candidates for removal or eviction. From the step 512, control proceeds to 514.

At the step 514, RRF issues a command to delete snap1 of V1. The logger can respond to the delete command by invalidating and thus canceling the corresponding create snap1 command of record 302*a*. Invalidating snap1 302*a* allows writes W1 (302*b*) and W2 (302*c*) to be flushed. Invalidating snap1 302*a* allows the create snap1 record 302*a* and delete snap1 record 302*g* to be canceled so that flushing can simply ignore records 302*a* and 302*g* without involving mapper (e.g., without inducing write splits, and without creating or deleting metadata for the snapshot or writes W1, W2). From the step 514, control proceeds to the step 516.

At the step 516, RRF sends a command or request to create snap 3 of V1 resulting in recording entry 302*h* in the log. From the step 516, control proceeds to the step 518.

At the step 518, the storage system receives write W5 directed to V1 resulting in recording entry 302*i* in the log. From the step 518, control proceeds to the step 520.

At the step 520, RRF computes the list or set of changed locations to V1 during the replication cycle or tracking session with tracking ID=ID2 between snap2 and snap3. RRF can determine the list by querying the cache for the list of tracked writes with tracking ID=ID2. In response, the cache can return the list of changed locations of LBAs of V1 written to or modified during the replication cycle between snap2 and snap3, where such locations are associated with tracked writes having tracking ID=ID2. In this example, the changed locations can be LBA C and LBA D of V1. RRF can determine a delta set of data differences or changes between snap2 and snap3 by reading from cache the contents of LBAs C and D of V1 as written during the corresponding replication cycle. The data changes of the delta set, including contents of LBAs C and D of V1, can be replicated from the source system to the target system and applied to the target volume V2. At this point, cache locations storing contents of LBAs C and D of V1 are no longer retained in cache (e.g., are not guaranteed to remain in cache) and can be candidates for cache removal or eviction. From the step 520, control proceeds to the step 522.

At the step 522, RRF issues a command to delete snap2 of V1. The logger can respond to the delete command by invalidating and thus canceling the corresponding take snap2 command of record 302*d*. Invalidating snap2 302*d* allows writes W3 (302*e*) and W4 (302*f*) to be flushed. Invalidating snap2 302*d* allows the records 302*d* and 302*j* to be canceled so that flushing can simply ignore records 302*d* and 302*j* without involving mapper (e.g., without inducing write splits, and without creating or deleting metadata for the snapshot or writes W3, W4).

In at least one embodiment, the first asynchronous replication technique or mode can be the snapshot difference technique discussed in more detail elsewhere herein that does not perform the optimizations of the low RPO replication technique. In at least one embodiment, the first asynchronous replication mode does not consume or use write tracking memory that is consumed or used in connection with the low RPO replication technique or mode.

In at least one embodiment with the first asynchronous mode, the snapshot difference can be determined between successive two snapshots that have been created and thus flushed from the log to mapper. In this manner with the legacy snapshot difference technique, metadata has been created by mapper for the two transient snapshots and any writes applied to the source volume can result in performing write split processing as noted elsewhere herein that includes allocating/creating one or more new metadata pages for use with the snapshots as writes are applied to the source volume. The snapshot difference technique of the first asynchronous replication mode can include determining the data differences between the two successive snapshots by traversing the metadata pages corresponding to each snapshot. Thus the foregoing can generally be more time consuming than determining the difference between two successive snapshots using the tracked writes with the low RPO technique. With first asynchronous replication mode rather than the low RPO mode, deleting the transient or replication related snapshots can also be more time consuming and can include performing expensive metadata page updates and/or deletion of metadata pages.

It should be noted that the low RPO replication technique and first asynchronous replication mode can both generally determine the differences or changes between successive snapshots of a volume. However, as discussed herein in at least one embodiment, the low RPO replication technique uses resources, such as the write tracking cache, and performs optimizations, such as using transient snapshots based on records retained in the log, that are otherwise omitted such that the low RPO replication technique is able to achieve much lower RPOs than the first asynchronous replication mode.

Thus in at least one embodiment, the low RPO replication technique can provide for much lower RPOs due to the optimizations and corresponding additional system resources such as cache and/or log resources.

In at least one embodiment in accordance with the techniques of the present disclosure, stopping criteria can be specified similar to that as described in connection with, for example, steps 818, 820 and 830 of FIGS. 7A and 7B. For example, in the step 830, the maximum iterations can denote a maximum number of delta synchronizations or replication cycles performed subsequent to the initial synchronization of step 802. In at least one embodiment, a delta synchronization can refer to a single iteration in connection with a single replication cycle or snapshot difference. If the maximum number is exceeded such that processing fails to enter the final phase and transition to the low RPO mode within the maximum number of iterations or within a maximum amount of time, processing can remain in the first phase and issue an alert. The alert can indicate, for example, that processing failed to enter or transition to the low RPO mode and the current asynchronous replication configuration of V1 and V2 cannot support the low RPO mode.

In at least one embodiment, the techniques of the present disclosure can be used in connection with transitioning from asynchronous replication mode to a metro replication configuration for bi-directional or two way synchronous replication between V1 and V2.

Figure 11:
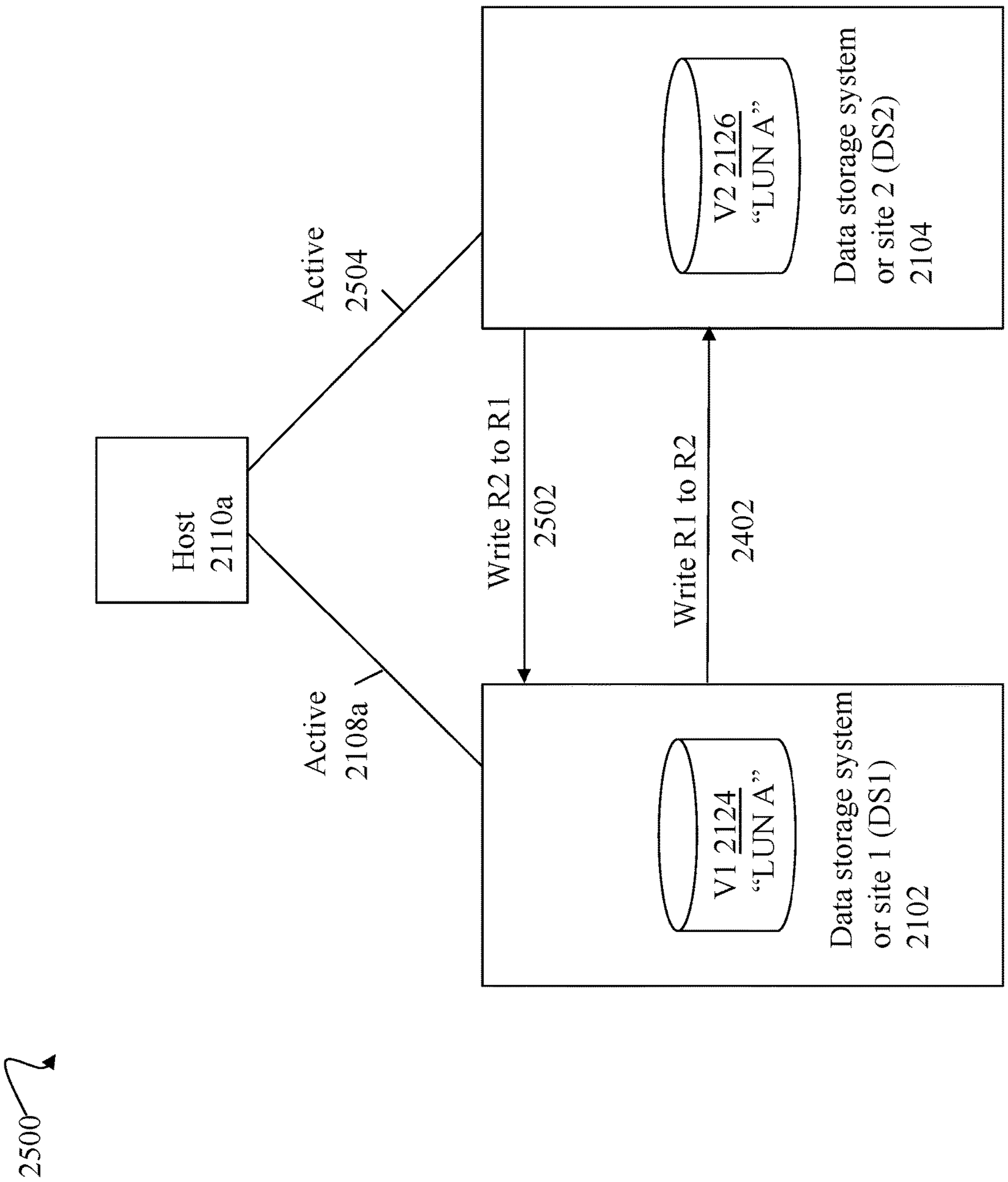

Referring to FIG. 11, shown is an example configuration 2500 of components that can be used in at least one embodiment in accordance with the techniques of the present disclosure. The configuration of FIG. 11 illustrates a metro configuration in at least one embodiment in accordance with the techniques of the present disclosure.

In the following discussion for purposes of illustration, the metro or stretched volume can be configured from two volume instances (2124, 2126) on two storage systems or sites (2102, 2104) where the two instances (2124, 2126) are configured to have the same identify of LUN A, denoting a volume or logical device LUN A.

The example 2500 includes the host 2110*a*, and storage systems or sites 2102, 2104. Each of the systems or sites 2102, 2104 can be a dual node storage system as discussed elsewhere herein.

In the active-active configuration or state with synchronous replication, the host 2110*a* can have a first active path 2108*a* to the first data storage system 1 2102 including a V1 device 2124 configured as LUN A. Additionally, the host 2110*a* can have a second active path 2504 to the second data storage system 2 2104 including a V2 device 2126 configured as the same LUN A. From the view of the host 2110*a*, the paths 2108*a* and 2504 appear as 2 paths to the same LUN A where the host in the example 2500 configuration can issue I/Os, both reads and/or writes, over both of the active paths 2108*a* and 2504. Thus from the viewpoint of the host 2110*a*, both instances 2124, 2126 of LUN A appear as the same volume or logical device, LUN A.

The host 2110*a* can send a first write over the path 2108*a* which is received by the first system 2102 and written to the log or cache of, or more generally committed by, the system 2102 where, at a later point in time, the first write is destaged from the cache or log of the system 2102 to physical storage provisioned for the V1 device 2124 configured as the LUN A. The system 2102 also sends the first write to the system 2104 over the link 2402 where the first write is written to the log or cache of (or more generally committed by) the system 2104, where, at a later point in time, the first write is destaged from the cache or log of the system 2104 to physical storage provisioned for the V2 device 2126 configured as the LUN A. Once the first write is written to the cache or log of (e.g., committed by) the system 2104, the system 2104 sends an acknowledgement over the link 2402 to the system 2102 that it has completed the first write. The system 2102 receives the acknowledgement from the system 2104 and then returns an acknowledgement to the host 2110*a* over the path 2108*a*, where the acknowledgement indicates to the host that the first write has completed.

The first write request can be directly received by the system or site 2102 from the host 2110*a* as noted above. Alternatively in a configuration of FIG. 11 in at least one embodiment, a write request, such as a second write request, can be initially received by the system or site 2104. In particular, the host 2110*a* can send the second write over the path 2504 which is received by the system 2104 and written to the cache or log of (more generally committed by) the system 2104 where, at a later point in time, the second write is destaged from the cache or log of the system 2104 to physical storage provisioned for the V2 device 2126 configured as the LUN A. The system 2104 also sends the second write to the system 2102 over the link 2502 where the second write is written to the cache or log of (more generally committed by) the system 2102, where, at a later point in time, the second write is destaged from the cache or log of the system 2102 to physical storage provisioned for the V1 device 2124 configured as the LUN A. Once the second write is written to the cache or log of the system 2102, the system 2102 sends an acknowledgement over the link 2502 to the system 2104 that it has completed the second write. The system 2104 receives the acknowledgement from the system 2102 and then returns an acknowledgement to the host 2110*a* over the path 2502, where the acknowledgement indicates to the host that the second write has completed.

In the example 2500, the illustrated active-active configuration includes the stretched LUN A configured from the device or volume pair (V1 2124, V2 2126), where the device or object pair (V1 2124, V2, 2126) is further configured for synchronous replication from the system 2102 to the system 2104, and also configured for synchronous replication from the system 2104 to the system 2102. In particular, the stretched LUN A is configured for dual, bi-directional or two-way synchronous remote replication: synchronous remote replication of writes from V1 2124 to V2 2126, and synchronous remote replication of writes from V2 2126 to V1 2124. To further illustrate synchronous remote replication from the system 2102 to the system 2104 for the stretched LUN A, a write to the stretched LUN A sent over 2108*a* to the system 2102 is stored on the V1 device 2124 and also transmitted to the system 2104 over 2402. The write sent over 2402 to system 2104 is stored on the V2 device 2126. Such replication is performed synchronously in that the received host write sent over 2108*a* to the data storage system 2102 is not acknowledged as successfully completed to the host 2110*a* unless and until the write data has been stored in caches or logs of, or otherwise committed or stored persistently by, both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the V1 device 2124. Such replication is performed synchronously in that the acknowledgement to the host write sent over 2504 is not acknowledged as successfully completed unless and until the write data has been stored in caches or logs of, or otherwise committed or stored persistently by, both the systems 2102 and 2104.

It should be noted that FIG. 11 illustrates a configuration with only a single host connected to both systems 2102, 2104 of the metro cluster. More generally, a configuration such as illustrated in FIG. 11 can include multiple hosts where one or more of the hosts are connected to both systems 2102, 2104 and/or one or more of the hosts are connected to only a single of the systems 2102, 2104.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 11 illustrates an active-active remote replication configuration for the stretched LUN A. The stretched LUN A is exposed to the host 2110*a* by having each volume or device of the device pair (V1 device 2124, V2 device 2126) configured and presented to the host 2110*a* as the same volume or LUN A. Additionally, the stretched LUN A is configured for two way synchronous remote replication between the systems 2102 and 2104 respectively including the two devices or volumes of the device pair, (V1 device 2124, V2 device 2126).

The configuration of FIG. 11 illustrates a metro configuration in at least one embodiment in accordance with the techniques of the present disclosure. In at least one embodiment, the techniques of the present disclosure can be used to transition from a first state or configuration to a second state or configuration. The first state or configuration can include i) asynchronous replication from V1 to V2. The second state or configuration can include the metro configuration such as illustrated in FIG. 11 with bidirectional or two way synchronous replication for the metro or stretched volume with synchronous replication of writes from V1 to V2 and also from V2 to V1. In at least one embodiment, processing can be performed as described herein for transitioning from asynchronous replication (as in FIG. 4) to the final phase that establishes synchronous replication for replicating writes from V1 to V2 along with additional processing of the final phase. The additional processing of the final phase can generally include all needed processing to establish the metro configuration as in FIG. 11 for synchronous replication of writes from V1 to V2, synchronous replication of writes from V2 to V1, and providing paths to both systems 2124, 2126 over which the host can issue I/Os, respectively, to V1 and V2 configured as the same logical volume or device. Thus in at least one embodiment, the techniques of the present disclosure can transition from i) an asynchronous replication mode for asynchronously replicating writes from V1 to V2 to ii) a metro configuration such as illustrated in FIG. 11. In at least one embodiment, processing can transition to the metro configuration of bi-directional synchronous replication once the one-way asynchronous replication session (e.g., asynchronous replication from V1 to V2) has a predicted transfer time for replicating or transferring a corresponding replication cycle of content below a specified maximum, such as described above in connection with transitioning to synchronous replication mode.

In at least one embodiment, the general overall processing as described in connection with FIGS. 7A and 7B can be adapted for use with any suitable use case or data processing application, some of which are described herein. As discussed above in at least one embodiment, the techniques of the present disclosure can be used in connection with transitioning from asynchronous replication between V1 and V2 to a final phase. The final phase can include any of: i) transitioning to synchronous replication between V1 and V2; ii) transitioning to low RPO asynchronous replication mode from V1 to V2; and iii) transitioning to a metro configuration with two-way or bi-directional synchronous replication between V1 and V2.

In at least one embodiment, the techniques of the present disclosure provide for transitioning the system from a first or start state, the asynchronous replication mode asynchronously replicating V1 data changes to V2, to another second target mode or state. The first phase can perform the asynchronous replication and processing of the first state. The first phase can also perform processing to determine when to transition to the final phase, where the final phase transitions the system to the second target mode or state. The second target mode or state can be any of: i) synchronous replication between V1 and V2; ii) low RPO asynchronous replication mode from V1 to V2; and iii) a metro configuration with two-way or bi-directional synchronous replication between V1 and V2. In at least one embodiment, any of the thresholds used herein, such as described in connection with FIGS. 7A and 7B processing, can vary with the particular use case or data application processing performed. Additionally, the particular processing of final phase can vary with the particular steps needed to establish the second target mode or state.

In at least one embodiment as may be suitable depending on the use case or data application process, any one of more of the following thresholds can be used: i) a first threshold denoting a maximum total amount of time allowed for performing the entire data processing application including the first phase and the final phase (e.g., the first threshold can denote a total amount of time allowed for performing data migration including its first phase and final phase); ii) a second threshold denoting a maximum amount of time allowed for performing the final phase; iii) a third threshold denoting a maximum amount of time allowed for the predicted final data transfer or transfer of the content of the last or final replication cycle/snapshot difference; iv) a fourth threshold denoting a maximum amount of time allowed for performing the first phase; v) a fifth threshold denoting the maximum number of iterations or snapshots taken subsequent to the initial synchronization in the first phase; vi) a sixth threshold denoting a maximum number of times that the final phase processing can be interrupted or stopped such as when the elapsed time of the final phase exceeds the second threshold. In at least one embodiment, the foregoing first threshold can be used to generally terminate the processing of the particular use case or overall data processing if exceeded by total elapsed processing time at any point. In at least one embodiment, the second threshold can be used in the step 820 where if the final phase elapsed time exceeds the second threshold, step 820 can be interrupted and proceed to step 824. In at least one embodiment, the second threshold can be used in the step 816 where if the predicted time for the final phase exceeds the second threshold, step 816 evaluates to yes (e.g., go to step 830) and otherwise evaluates to no (e.g., go to step 818). In at least one embodiment, the third threshold can be used in the step 816 to determine whether a predicted time for the last data copy or transfer of the last replication cycle, where if the predicted time exceeds the third threshold, processing remains in the first phase and otherwise processing proceeds to the step 818 with the final phase. In at least one embodiment, the use case or data application processing can stop if the elapsed time of the first phase exceeds the above-noted fourth threshold. In at least one embodiment, the use case or data application processing can stop if the fifth threshold is exceeded in the first phase. In at least one embodiment, the sixth threshold can be used in the step 820 where if the actual number of final phase processing timeouts exceeds the sixth threshold, control proceeds to the step 824, and otherwise to step 822.

In at least one embodiment, the techniques of the present disclosure can provide for minimizing the window or amount of time of the final phase of processing that transitions or switches from a first state, mode or configuration to a target state, mode or configuration.

Although the techniques of the present disclosure are described herein with examples for transitioning between states or configurations for a pair of volumes V1 of DS1 and V2 of DS1, the techniques of the present disclosure can also be applied for use in connection with multiple pairs of such volumes, or more generally two volume groups G1 of DS1 and G2 of DS2, where each V1 of G1 has a unique corresponding V2 of G2. In at least one embodiment when using groups G1 and G1 of volumes as noted above, the transition from a first state or configuration (e.g., first phase processing) to a second state or configuration (e.g., final phase processing) can be performed when specified transition criteria, such as at step 816 of FIG. 7B, is met by all such pairs of volumes (V1, V2) of the groups G1 and G2.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:

establishing an asynchronous replication configuration of a first volume V1 of a first system and a second volume V2 of a second system, wherein data changes of V1 are asynchronously replicated from the first system to the second system for application to V2;

periodically taking snapshots of V1 using a predefined time interval between successive snapshots;

determining a first set of data changes between a first pair of successive snapshots of V1;

transferring the first set of data changes from the first system to the second system;

determining an average data transfer rate and an average data change rate based, at least in part, on the first set of data changes and an amount of time taken to transfer the first set of data changes from the first system to the second system, wherein the average data change rate is an average rate at which content is written to V1 by writes directed to V1 and received at the first system, wherein the average data change rate is calculated at least in part based on a size of the first set of data changes divided by the predefined time interval, and wherein the average data transfer rate is calculated at least in part based on the size of the first set of data changes divided by the amount of time taken to transfer the first set of data changes from the first system to the second system;

determining, based at least in part, on the average data transfer rate and the average data change rate, a first predicted time denoting an amount of time expected to complete a final processing phase that transitions the asynchronous replication configuration from a first state to a second state;

determining whether the first predicted time exceeds a first threshold; and responsive to determining that the first predicted time does not exceed the first threshold, performing the final processing phase that transitions the asynchronous replication configuration from the first state to the second state.

2. The computer-implemented method of claim 1, further comprising:

receiving, at the first system while transferring the first set of data changes, first writes to V1;

responsive to determining that the first predicted time does exceed the first threshold, remaining in the first state and performing first processing including:

determining, based on the first writes, a second set of data changes between a second pair of successive snapshots of V1, wherein the first writes are included in the second set of data changes;

transferring the second set of data changes from the first system to the second system;

determining a first updated value for the average data transfer rate and a second updated value for the average data change rate based, at least in part, on the second set of data changes and an amount of time taken to transfer the second set of data changes from the first system to the second system, wherein the average data change rate is further calculated at least in part based on a size of the second set of data changes divided by the predefined time interval, and wherein the average data transfer rate is further calculated at least in part based on the size of the second set of data changes divided by the amount of time taken to transfer the second set of data changes from the first system to the second system;

determining, based at least in part, on the first updated value for average data transfer rate and the second updated value of the average data change rate, a second predicted time denoting an amount of time expected to complete the final processing phase that transitions the asynchronous replication configuration from the first state to the second state;

determining whether the second predicted time exceeds the first threshold; and responsive to determining that the second predicted time does not exceed the first threshold, performing the final processing phase that transitions the asynchronous replication configuration from the first state to the second state.

3. The computer-implemented method of claim 1, wherein the method is performed in connection with migrating content of V1 of the first system to V2 of the second system, wherein in the first state, there are one or more first paths that are between one or more hosts and the first system, and wherein V1 is accessible over the one or more paths to one or more hosts for issuing I/Os directed to V1, wherein in the first state, there are no paths between the one or more hosts and the second system over which the one or more hosts issue I/Os directed to V2.

4. The computer-implemented method of claim 3, wherein the final processing phase includes:

transitioning the asynchronous replication configuration from the first state to the second state where i) V1 is inaccessible or unavailable to the one or more hosts, and ii) V2 is accessible to the one or more hosts, over one or more second paths between the one or more hosts and the second system, so that the one or more hosts issue I/Os directed to V2 at the second system.

5. The computer-implemented method of claim 4, wherein said transitioning of the final processing phase includes:

quiescing second writes that are directed to V1 and received at V1 from the one or more hosts whereby servicing of the second writes is not allowed to commence;

draining third writes that are i) pending or in-progress, and ii) directed to V1 whereby the third writes are allowed to complete;

subsequent to said quiescing and said draining, determining a final set of data changes to V1, wherein the final set includes the third writes, wherein the final set of data changes are data changes between a second pair of successive snapshots of V1;

transferring the final set of data changes from the first system to the second system; and applying the final set of data changes to V2 of the second system.

6. The computer-implemented method of claim 5, wherein the final processing phase includes:

after transitioning from the first state to the second state, mirroring writes made to V2 of the second system onto V1 of the first system until migration of V1 to V2 is committed.

7. The computer-implemented method of claim 1, wherein the final processing phase includes performing a deterministic sequence of processing steps to determine whether to transition the asynchronous replication configuration from the first state to the second state within an amount of elapsed time that does not exceed the first threshold, and wherein the method further comprises:

measuring a first elapsed time denoting an amount of elapsed time of the final processing phase;

responsive to the first elapsed time exceeding the first threshold, interrupting the final processing phase and resuming a first phase of processing performed when the asynchronous replication configuration is in the first state.

8. The computer-implemented method of claim 7, wherein said first phase includes: said determining the first set of data changes, said transferring the first set of data changes, and said determining the average data transfer rate and the average data change rate based, at least in part, on the first set of data changes and the amount of time taken to transfer the first set of data changes.

9. The computer-implemented method of claim 8, wherein said resuming the first phase includes:

determining a second set of data changes between a second pair of successive snapshots of V1;

transferring the second set of data changes from the first system to the second system;

determining a first updated value for the average data transfer rate and a second updated value for the average data change rate based, at least in part, on the second set of data changes and an amount of time taken to transfer the second set of data changes from the first system to the second system;

determining, based at least in part, on the first updated value for average data transfer rate and the second updated value of the average data change rate, a second predicted time denoting an amount of time expected to complete the final processing phase that transitions the asynchronous replication configuration from the first state to the second state;

determining whether the second predicted time exceeds the first threshold; and responsive to determining that the second predicted time does not exceed the first threshold, performing the final processing phase that transitions the asynchronous replication configuration from the first state to the second state.

10. The computer-implemented method of claim 1, wherein the method is performed in connection with transitioning the asynchronous replication configuration from the first state to the second state, wherein in the second state, V1 and V2 are configured in a synchronous replication configuration to synchronously replicate writes of V1 from the first system to V2 of the second system.

11. The computer-implemented method of claim 10, wherein in the first state, there are one or more first paths that are between one or more hosts and the first system, and wherein V1 is accessible over the one or more paths to one or more hosts for issuing I/Os directed to V1, wherein in the first state, there are no paths between the one or more hosts and the second system over which the one or more hosts issue I/Os directed to V2.

12. The computer-implemented method of claim 10, wherein in the second state, V1 is accessible over the one or more paths to the one or more hosts for issuing I/Os directed to V1, wherein in the second state, there are no paths between the one or more hosts and the second system over which the one or more hosts issue I/Os directed to V2.

13. The computer-implemented method of claim 1, wherein the method is performed in connection with transitioning the asynchronous replication configuration from the first state to the second state, wherein in the first state, writes of V1 are asynchronously replicated from the first system to the second system in a first replication mode, and wherein in the second state, V1 and V2 are configured in a second asynchronous replication mode to synchronously replicate writes of V1 from the first system to the second system.

14. The computer-implemented method of claim 13, wherein the second replication mode performs one or more optimizations for improved asynchronous replication which are not performed in the first replication mode of the first state.

15. The computer-implemented method of claim 14, wherein the one or more optimizations include one or more of:

write tracking where data changes or writes to V1 to be replicated are stored in cache;

holding transient or replication related snapshots used in determining sets of data changes to V1 in a log without flushing until said transient or replication related snapshots are deleted from the log; and content of V1 to be replicated remains in a cache of the first system until replicated from the first system to the second system.

16. The computer-implemented method of claim 1, wherein the method is performed in connection with transitioning the asynchronous replication configuration from the first to the second state, wherein the second state is a metro or stretched volume configuration where writes of V1 are synchronously replicated from the first system to the second system and where writes of V2 are synchronously replicated from the second system to the first system, wherein in the second state, one or more hosts issue I/Os to V1 over first one or more paths to the first system, wherein in the second state, the one or more hosts issue I/Os to V2 over second one or more paths to the second system, and wherein V1 and V2 are configured to have a same identity when presented to the one or more hosts over the first one or more paths and the second one or more paths.

17. A system comprising:

one or more processors; and one or more memories comprising code stored thereon that, when executed, performs a method comprising:

periodically taking snapshots of V1 using a predefined time interval between successive snapshots;

establishing an asynchronous replication configuration of a first volume V1 of a first system and a second volume V2 of a second system, wherein data changes of V1 are asynchronously replicated from the first system to the second system for application to V2;

determining a first set of data changes between a first pair of successive snapshots of V1;

transferring the first set of data changes from the first system to the second system;

determining an average data transfer rate and an average data change rate based, at least in part, on the first set of data changes and an amount of time taken to transfer the first set of data changes from the first system to the second system, wherein the average data change rate is an average rate at which content is written to V1 by writes directed to V1 and received at the first system, wherein the average data change rate is calculated at least in part based on a size of the first set of data changes divided by the predefined time interval, and wherein the average data transfer rate is calculated at least in part as the size of the first set of data changes divided by the amount of time taken to transfer the first set of data changes from the first set of data changes from the first system to the second system;

determining, based at least in part, on the average data transfer rate and the average data change rate, a first predicted time denoting an amount of time expected to complete a final processing phase that transitions the asynchronous replication configuration from a first state to a second state;

determining whether the first predicted time exceeds a first threshold; and responsive to determining that the first predicted time does not exceed the first threshold, performing the final processing that transitions the asynchronous replication configuration from the first state to the second state.

18. One or more non-transitory computer-readable media comprising code stored thereon that, when executed, performs a method comprising:

establishing an asynchronous replication configuration of a first volume V1 of a first system and a second volume V2 of a second system, wherein data changes of V1 are asynchronously replicated from the first system to the second system for application to V2;

periodically taking snapshots of V1 using a predefined time interval between successive snapshots;

determining a first set of data changes between a first pair of successive snapshots of V1;

transferring the first set of data changes from the first system to the second system;

determining an average data transfer rate and an average data change rate based, at least in part, on the first set of data changes and an amount of time taken to transfer the first set of data changes from the first system to the second system, wherein the average data change rate is an average rate at which content is written to V1 by writes directed to V1 and received at the first system, wherein the average data change rate is calculated at least in part based on a size of the first set of data changes divided by the predefined time interval, and wherein the average data transfer rate is calculated at least in part as the size of the first set of data changes divided by the amount of time taken to transfer the first set of data changes from the first set of data changes from the first system to the second system;

determining, based at least in part, on the average data transfer rate and the average data change rate, a first predicted time denoting an amount of time expected to complete a final processing phase that transitions the asynchronous replication configuration from a first state to a second state;

determining whether the first predicted time exceeds a first threshold; and responsive to determining that the first predicted time does not exceed the first threshold, performing the final processing phase that transitions the asynchronous replication configuration from the first state to the second state.

* * * * *